(12) United States Patent
Liang et al.

(10) Patent No.: US 12,126,051 B2
(45) Date of Patent: Oct. 22, 2024

(54) ELECTRODE ASSEMBLY AND RELATED BATTERY, BATTERY MODULE

(71) Applicant: Contemporary Amperex Technology (Hong Kong) Limited, Hong Kong (CN)

(72) Inventors: Chengdu Liang, Ningde (CN); Haizu Jin, Ningde (CN); Hu Xu, Ningde (CN); Yuqun Zeng, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 737 days.

(21) Appl. No.: 17/130,717

(22) Filed: Dec. 22, 2020

(65) Prior Publication Data

US 2021/0376428 A1    Dec. 2, 2021

Related U.S. Application Data

(63) Continuation of application No. PCT/CN2020/094040, filed on Jun. 2, 2020.

(51) Int. Cl.
*H01M 50/538* (2021.01)
*H01M 10/0525* (2010.01)
(Continued)

(52) U.S. Cl.
CPC ..... *H01M 50/538* (2021.01); *H01M 10/0525* (2013.01); *H01M 10/0587* (2013.01); *H01M 50/54* (2021.01)

(58) Field of Classification Search
CPC . H01M 10/0587; H01M 50/538; H01M 50/54
See application file for complete search history.

(56) References Cited

U.S. PATENT DOCUMENTS 8,293,391 B2    10/2012    Kawase
9,263,772 B2 *   2/2016    Kim ................. H01M 10/0587
(Continued)

FOREIGN PATENT DOCUMENTS

CN    2922148 Y    7/2007
CN    201207413 Y    3/2009
(Continued)

OTHER PUBLICATIONS

English translation of JP Publication 2005-116186, Apr. 2005.*
(Continued)

*Primary Examiner* — Brittany L Raymond
(74) *Attorney, Agent, or Firm* — STERNE, KESSLER, GOLDSTEIN & FOX P.L.L.C.

(57) ABSTRACT

An electrode assembly as provided includes a plurality of first electrode plates and at least one second electrode plate. The plurality of first electrode plates and the at least one second electrode plate are wound around a winding axis to form a winding structure. In the winding structure, the plurality of first electrode plates and the second electrode plate are arranged in a superimposing manner along a direction vertical to the winding axis. Each first electrode plate includes a first current collector and a first active substance layer, and the first current collector includes a first main body portion and a first tab which protrudes from the first main body portion along the direction of the winding axis; wherein each first tab and the first main body portion are arranged in parallel along the winding axis.

18 Claims, 10 Drawing Sheets

(51) Int. Cl.
*H01M 10/0587* (2010.01)
*H01M 50/54* (2021.01)

(56) References Cited

U.S. PATENT DOCUMENTS

| | | | |
|---|---|---|---|
| 10,644,322 B2 | 5/2020 | Xing et al. | |
| 2009/0239133 A1 | 9/2009 | Kosugi | |
| 2013/0244073 A1 | 9/2013 | Hideki et al. | |
| 2018/0026295 A1* | 1/2018 | Lim | H01M 10/0587 320/128 |
| 2018/0034109 A1* | 2/2018 | Wang | H01M 10/286 |
| 2020/0203733 A1 | 6/2020 | Xing et al. | |

FOREIGN PATENT DOCUMENTS

| | | | |
|---|---|---|---|
| CN | 101542817 A | | 9/2009 |
| CN | 201408811 Y | | 2/2010 |
| CN | 102084533 A | | 6/2011 |
| CN | 202308207 | * | 7/2012 |
| CN | 202308207 U | | 7/2012 |
| CN | 103415955 A | | 11/2013 |
| CN | 104810561 A | | 7/2015 |
| CN | 108428849 A | | 8/2018 |
| CN | 108886128 | * | 11/2018 |
| CN | 108886128 A | | 11/2018 |
| CN | 109755462 A | | 5/2019 |
| CN | 209401755 U | | 9/2019 |
| CN | 108281662 B | | 5/2020 |
| CN | 111326699 A | | 6/2020 |
| JP | 2005-116186 | * | 4/2005 |
| JP | 2011233408 A | | 11/2011 |

OTHER PUBLICATIONS

Extended European Search Report issued in European Application No. 20812212.7, mailed Apr. 29, 2022, 8 pages.
Office Action Issued by CNIPA for CN 202080070406.0, mailed on Oct. 14, 2023, 7 pages.
EPO Examination Report for EP 20 812 212.7, mailed on Sep. 11, 2023, 8 pages.

* cited by examiner

`ELECTRODE ASSEMBLY AND RELATED
BATTERY, BATTERY MODULE`

CROSS-REFERENCE TO RELATED APPLICATION

This application is a continuation of International Application No. PCT/CN2020/094040 filed on Jun. 2, 2020, which is hereby incorporated herein by reference in its entirety.

TECHNICAL FIELD

The present disclosure relates to the field of batteries, in particular to an electrode assembly and a related battery, a related battery module.

BACKGROUND

Owing to such advantages as small size, high energy density, high power density, multiple cycles and long storage time, lithium ion batteries are widely used in some electronic equipment, electric transportation tools, electric toys and electric devices, for example, lithium ion batteries have been widely used in mobile phones, notebook computers, battery cars, electric vehicles, electric airplanes, electric ships, electric toy cars, electric toy ships, electric toy airplanes and electric tools.

The electrode assembly is an important unit of the lithium ion battery, and the winding electrode assembly has been widely used in lithium ion batteries owing to its characteristics of simple production process and high production efficiency.

SUMMARY

A first aspect of the present disclosure provides an electrode assembly which comprises a plurality of first electrode plates and at least one second electrode plate, wherein the polarity of the first electrode plate is opposite to the polarity of the second electrode plate, the plurality of first electrode plates and the at least one second electrode plate are wound around a winding axis to form a winding structure, in the winding structure, the plurality of first electrode plates and the at least one second electrode plate are arranged in a superimposing manner along a direction vertical to the winding axis; each first electrode plate in the plurality of first electrode plates comprises a first current collector and a first active substance layer arranged on a superimposing surface of the first current collector, and the first current collector comprises a first main body portion provided with a first active substance layer and at least one first tab which protrudes from the first main body portion along the direction of the winding axis; wherein each first tab in the at least one first tab and the first main body portion are arranged in parallel along the winding axis.

In some embodiments, each first electrode plate comprises a plurality of first tabs which are arranged at intervals.

In some embodiments, in the winding structure, each first electrode plate is provided with at least one tab on each of its circles.

In some embodiments, any two first tabs in all of the first tabs are at least partially overlapped.

In some embodiments, the winding structure is flat and comprises a straight section and turning sections arranged on two sides of the straight section; and all of the first tabs are arranged in the straight section.

In some embodiments, the straight section comprises a first straight sub-section and a second straight sub-section which are substantially parallel and distributed symmetrically about the winding axis; all of the first tabs are arranged in the first straight sub-section or the second straight sub-section.

In some embodiments, the straight section comprises a first straight sub-section and a second straight sub-section which are substantially parallel and distributed symmetrically about the winding axis; a part of all of the first tabs are arranged in the first straight sub-section, while the other part of the first tabs are arranged in the second straight sub-section.

In some embodiments, the positions of the winding initial ends of at least two first electrode plates in the plurality of first electrode plates are different.

In some embodiments, the positions of the winding tail ends of at least two first electrode plates in the plurality of first electrode plates are different.

In some embodiments, the electrode assembly comprises a plurality of second electrode plates, wherein the positions of the winding initial ends of at least two second electrode plates in the plurality of second electrode plates are different.

In some embodiments, the electrode assembly comprises a plurality of second electrode plates, the positions of the winding tail ends of at least two second electrode plates in the plurality of second electrode plates are different.

In some embodiments, the winding structure is flat and comprises a straight section and turning sections arranged at two sides of the straight section; and wherein the winding tail end of at least one first electrode plate in the plurality of first electrode plates are arranged in the turning section.

In some embodiments, the electrode assembly comprises a plurality of second electrode plates, the winding structure is flat and comprises a straight section and turning sections arranged at two sides of the straight section, the winding tail end of at least one second electrode plate in the plurality of second electrode plates are arranged in the turning section.

In some embodiments, in different radial directions of the winding structure, the difference of number of layers of the first electrode plate and the second electrode plate does not exceed a preset number of layers.

A second aspect of the present disclosure provides a battery, comprising:
a case; and
an electrode assembly provided in the above embodiments, wherein the electrode assembly is arranged in the case.

A third aspect of the present disclosure provides a battery module, comprising: a plurality of batteries provided in the above embodiments.

Other characteristics and advantages of the present disclosure will become clear through a detailed description of exemplary embodiments of the present disclosure with reference to accompanying drawings below.

BRIEF DESCRIPTION OF THE DRAWINGS

Drawings illustrated herein are used for providing further understanding of the present disclosure and form part of the present disclosure, and illustrative embodiments of the present disclosure and description thereof are intended for explaining instead of improperly limiting the present disclosure. In the drawings.

DETAILED DESCRIPTION

Figure 1:
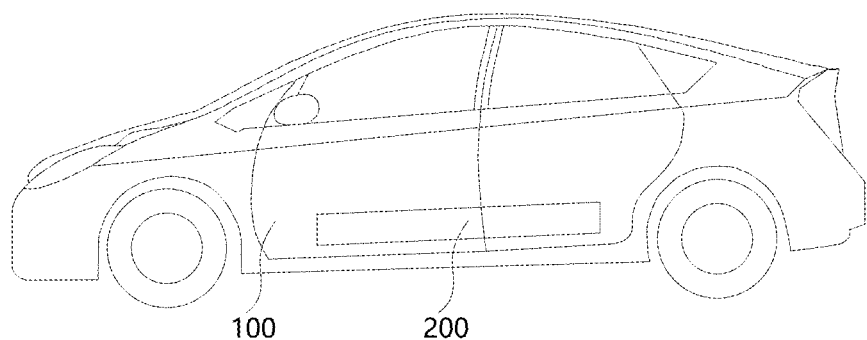
FIG. 1 is an outline schematic diagram of some embodiments of a vehicle adopting a battery of the present disclosure.

In order to make the objectives, technical solutions, and advantages of the embodiments of the present disclosure clearer, a clear and complete description of the technical solutions of the embodiments of the present disclosure will be given below in combination with accompanying drawings in the embodiments of the present disclosure. Apparently, the described embodiments are only a part but not all of the embodiments of the present disclosure. Based upon the embodiments of the present disclosure, all of the other embodiments obtained by those skilled in the art without any creative effort shall all fall within the protection scope of the present disclosure.

Unless otherwise defined, all of the technical and scientific terms used in the text have the same meanings as those understood by persons skilled in the art in the technical field of the present disclosure; in the present text, the terms used in the applied description are merely for the purpose of describing specific embodiments, rather than for limiting the present disclosure; the terms "including" and "having" and any variation thereof in the description and claims and the above brief description of the drawings of the present disclosure intend to encompass non-exclusive inclusions. The terms such as "first" and "second" in the description and claims or the above drawings of the present disclosure are used for distinguishing different objects, rather than for describing a particular sequence or primary or secondary relationship.

The mentioning of "embodiment" in the present text means that specific characteristics, structures or properties described in combination with embodiments can be included in at least one embodiment of the present disclosure. The occurrence of this phrase in various positions of the description does not necessarily refer to the same embodiment, nor refer to independent or alternative embodiment which is mutually exclusive with the other embodiments. Those skilled in the art can explicitly and implicitly understand that, the embodiments described in the text can be combined with other embodiments.

The term "and/or" in the text merely describes an incidence relationship of associated objects, and represents the existence of three relationships, for example, A and/or B can represent: A exists alone, A and B exist simultaneously, B exists alone. In addition, the character "/" in the text generally represents that the front and rear associated objects are of an "or" relationship.

The term "a plurality of" in the present disclosure refers to more than two, similarly, "a plurality of groups" refers to more than two groups, and "a plurality of plates" refers to more than two plates.

The electrode assembly and the manufacturing method thereof, the battery, the battery module and the battery pack described in the embodiments of the present disclosure are all applicable to various devices using batteries, for example, mobile phones, notebook computers, battery cars, electric vehicles, ships, space vehicles, electric toys, and electric tools, etc., for example, the space vehicles include airplanes, rockets, space shuttles, and spacecrafts, etc., the electric toys include fixed or mobile electric toys, for example, game machines, electric vehicle toys, electric ship toys, electric airplane toys, etc., the electric tools include metal cutting electric tools, grinding electric tools, assembly electric tools and electric tools used in railways, for example, electric drills, electric grinders, electric wrenches, electric screw drivers, electric hammers, electric impact drills, concrete vibrators and electric planers.

The electrode assembly, the battery, the battery module and the battery pack described in the embodiments of the present disclosure are not only applicable to the devices described above, but also applicable to all of the devices using batteries, however, to facilitate description, electric vehicles are taken as an example for illustration in the following embodiments.

For example, FIG. 1 is a structural schematic diagram of a vehicle 100 of an embodiment of the present disclosure. The vehicle 100 can be an oil-fueled vehicle, a gas vehicle or a new-energy vehicle, and the new-energy vehicle can be a battery electric vehicle, a hybrid electric vehicle or an extended range vehicle. A battery pack 200 can be arranged inside the vehicle 100, for example, the battery pack 200 can be arranged at the bottom or the front or rear end of the vehicle 100. The battery pack 200 can be used for the power supply of the vehicle 100, for example, the battery pack 200 can serve as an operating power supply of the vehicle 100, and serve as a circuit system of the vehicle 100, for example, the battery pack 200 can satisfy power demands of the vehicle 100 during starting, navigation and operation of the vehicle 100. In another embodiment of the present disclosure, the battery pack 200 can not only serve as an operational power supply of the vehicle 100, but also serve as a driving power supply of the vehicle 100, to substitute or partially substitute fuel oil or natural gas to provide driving power for the vehicle 100.

Figure 2:
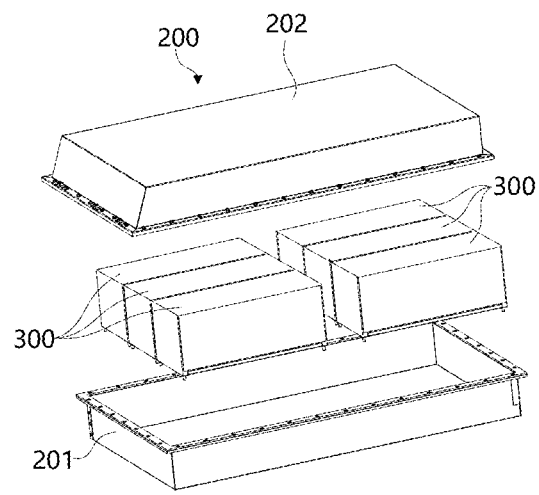
FIG. 2 is a structural schematic diagram of some embodiments of a battery pack of the present disclosure.

To satisfy different requirements of electricity use, the battery pack 200 can include one battery module or a plurality of battery modules, wherein the plurality of battery modules can be connected in series or in parallel or in series and parallel, and the connection in series and parallel refers to a combination of series connection and parallel connection. For example, FIG. 2 is a structural schematic diagram of a battery pack 200 of another embodiment of the present disclosure. The battery pack 200 comprises a first case 201, a second case 202 and a plurality of battery modules 300, wherein the shapes of the first case 201 and the second case 202 are determined according to the combined shapes of the plurality of battery modules 300, the first case 201 and the second case 202 are both provided with an opening, for example, the first case 201 and the second case 202 can both be hollow cuboids with only one surface being an opening surface respectively, that is, the surface has no case wall, such that the inside and the outside of the case are communicated, the first case 201 and the second case 202 are buckled with each other at the opening to form a closed case of the battery pack 200, and after the plurality of battery modules 300 are connected in parallel or connected in series or connected in series and parallel, the plurality of battery modules 300 are placed in the case formed after the first case 201 is buckled with the second case 202.

In another embodiment of the present disclosure, when the battery pack 200 comprises a battery module 300, the battery module 300 is placed in the case formed after the first case 201 is buckled with the second case 202.

The electricity generated through the one or more battery modules 300 penetrates through the case through a conducting mechanism and is led out.

Figure 3:
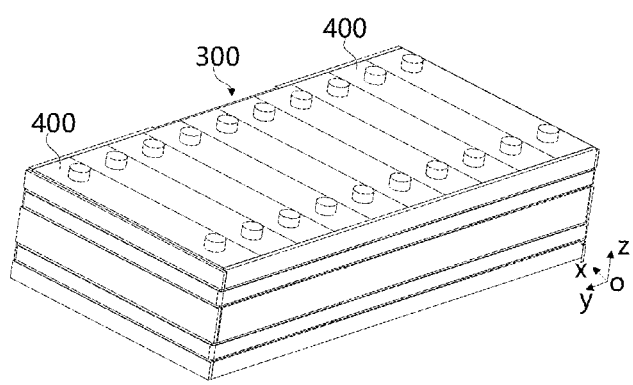
FIG. 3 is a structural schematic diagram of some embodiments of a battery module of the present disclosure.

According to different power demands, the battery module 300 can also include one or more batteries, as shown in FIG. 3, the battery module 300 comprises a plurality of batteries 400, and the plurality of batteries 400 can be connected through a manner of series connection, parallel connection or series and parallel connection, to realize a large capacity or power. For example, the battery 400 comprises, but is not limited to, a lithium ion secondary battery, a lithium ion primary battery, a lithium sulfur battery, a sodium lithium ion battery, or a magnesium ion battery. The battery 400 can be cylindrical, flat, and rectangular or of other shapes.

Figure 4:
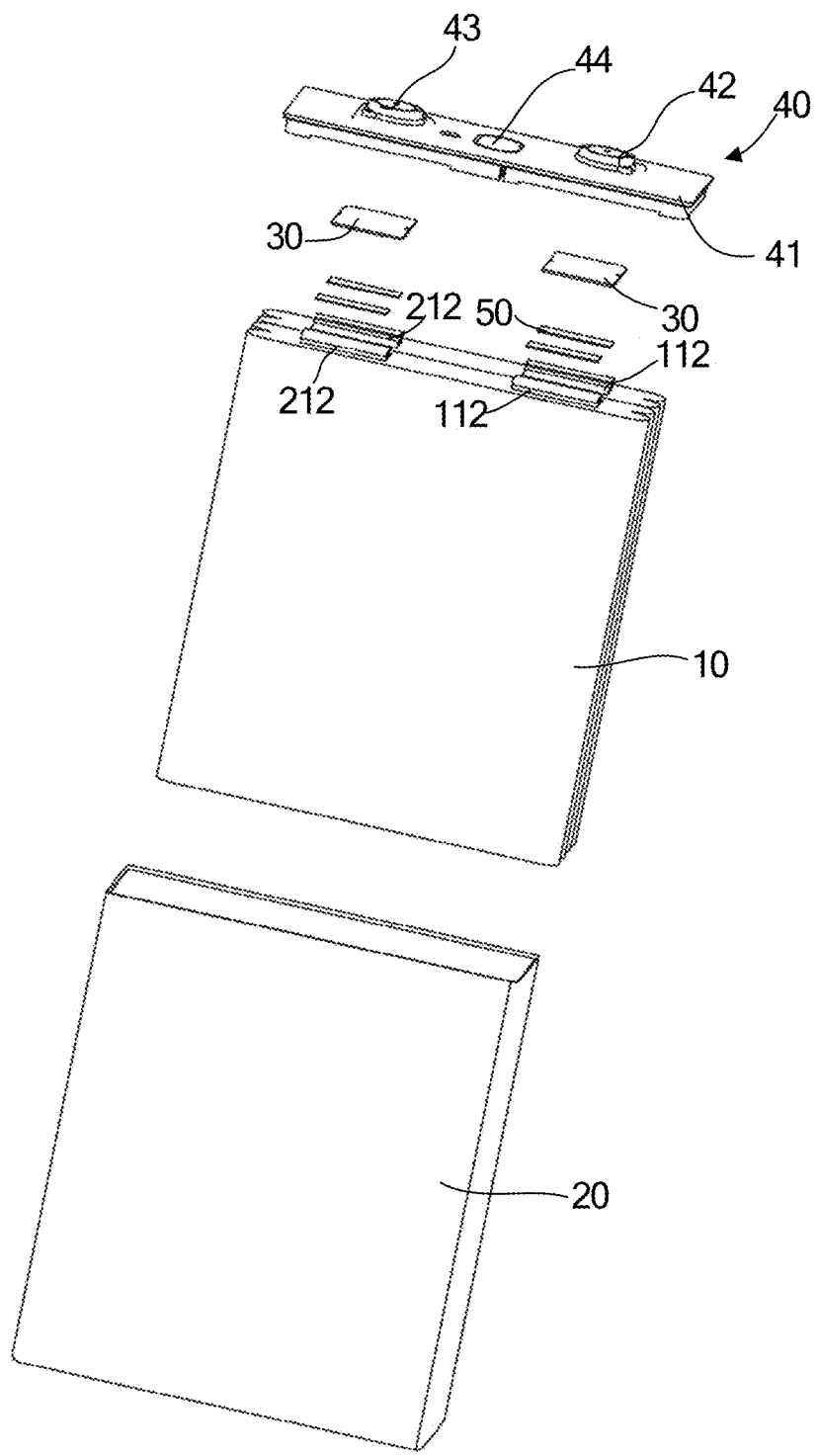
FIG. 4 is an exploded view of some embodiments of a battery of the present disclosure.

In another embodiment of the present disclosure, a plurality of batteries 400 can be superimposed together, and the plurality of batteries 400 can be connected in series, in parallel or in series and parallel. In another embodiment of the present disclosure, each battery 400 can be square, cylindrical or of other shapes. For example, FIG. 4 is a structural schematic diagram of a battery 400 of another embodiment of the present disclosure, the battery 400 comprises one or more electrode assemblies 10, a case 20 and an end cover assembly 40. The shape of the case 20 can be determined according to the combined shapes of one or more electrode assemblies 10, for example, the case 20 can be a hollow cuboid or cube or cylinder, moreover, one of the surfaces of the case 20 is provided with an opening, such that one or more electrode assemblies 10 can be placed in the case 20, for example, when the case 20 is a hollow cuboid or cube, one of the planes of the case 20 is an opening surface, that is, the plane has no case wall, such that the inside and the outside of the case 20 are communicated, when the housing 20 can be a hollow cylinder, the circular side face of the case 20 is an opening surface, that is, the circular side face has no case wall, such that the inside and the outside of the case 20 are communicated. The end cover assembly 40 is connected with the case 20 at the opening of the case 20 to form a closed case to place the battery 400, and the case 20 is internally filled with electrolyte.

The end cover assembly 40 comprises an end cover 41 and a first terminal 42 and a second terminal 43 arranged on the end cover 41, the end cover 41 is substantially flat, the first terminal 42 and the second terminal 43 are arranged on the flat surface of the end cover 41 and penetrate through the flat surface of the end cover 41, the first terminal 42 and the second terminal 43 are correspondingly provided with a collector component 30, and the collector component 30 is arranged between the end cover 41 and the electrode assembly 10.

For example, as shown in FIG. 4, each electrode assembly 10 is provided with a first tab 112 and a second tab 212, the first tab 112 of one or more electrode assemblies 10 is connected with a first terminal 42 through a collector component 30, and the second tab 212 of one or more electrode assemblies 10 is connected with the second terminal 43 through another collector component 30. Moreover, the electrode assembly 10 further comprises a welding protection plate 50 arranged between the tab and the corresponding collector component 30.

In another embodiment of the present disclosure, the flat surface of the end cover 41 can further be provided with an anti-explosion valve 44, the anti-explosion valve 44 can be a part of the flat surface of the end cover 41, and can also be welded with the flat surface of the end cover 41. The anti-explosion valve 44 has a nick, and the depth of the nick is smaller than the thickness of other areas, except the nick, of the anti-explosion valve 44, to achieve the purpose of not penetrating through the anti-explosion valve 44, that is, under normal states, the anti-explosion valve 44 is in sealed combination with the end cover 41, the end cover assembly 40 is connected with the case 20 at the opening of the case 20 through the end cover 41 to form a case for placing the battery 400, and the space formed by the case is sealed and airtight. In the case, when the battery 400 produces too much gas, and when the gas expands such that the air pressure in the case rises to exceed a preset value, the anti-explosion valve 44 is cracked at the nick and the inside and the outside of the case are communicated, and gas is released outwards through the cracking point of the anti-explosion valve 44, to further avoid explosion.

In the battery 400, according to actual use demands, a single or a plurality of electrode assemblies 10 can be arranged, and as shown in FIG. 4, the battery 400 is internally provided with at least two independent electrode assemblies 10.

To improve the volumetric energy density of the lithium ion battery, the electrode assembly generally needs to be wound for a plurality of turns, when the electrode assembly is wound for a plurality of times, and a tab is easily misplaced seriously, thereby influencing the connection with the collector component.

The present disclosure provides an electrode assembly and a related battery, device, manufacturing method and manufacturing device thereof, to improve the problem of misplacement of the tab caused by winding for a plurality of times.

Figure 5:
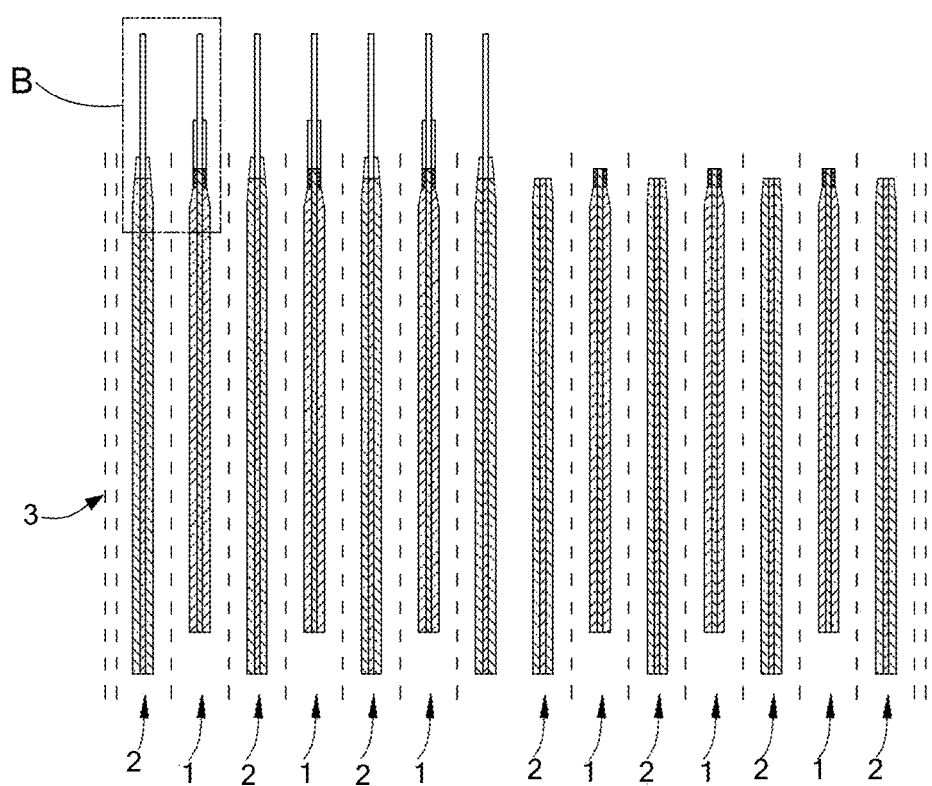
FIG. 5 is a side view of some embodiments in which the first electrode plates and the second electrode plates are arranged at intervals in an electrode assembly of the present disclosure.

In some embodiments, as shown in FIG. 5, the electrode assembly 10 comprises: a plurality of first electrode plates 1 and at least one second electrode plate 2, wherein the polarity of the first electrode plate 1 is opposite to the polarity of the second electrode plate 2, for example, the first electrode plate 1 is a positive electrode plate, and the second electrode plate 2 is a negative electrode plate, and vice versa. The plurality of first electrode plates 1 and the at least one second electrode plate 2 are wound around a winding axis K to form a winding structure, in the winding structure, the plurality of first electrode plates 1 and the at least one second electrode plate 2 are arranged in a superimposing manner along a direction vertical to the winding axis K.

The number of the first electrode plate 1 and the second electrode plate 2 can be the same and can also be different. In some embodiments, the sum of the number of all of the first electrode plates 1 and all of the second electrode plates 2 is greater than or equal to 3. For example, the electrode assembly 10 comprises two, three or four first electrode plates 1 and one, two, three or four second electrode plates 2.

In the embodiment of the present disclosure, the shape of each first electrode plate 1 is substantially the same as the shape of each second electrode plate 2, for example, after the winding structure is flattened, the first electrode plates 1 and the second electrode plates 2 are substantially strip-shaped, for example, the first electrode plates 1 and the second electrode plates 2 can be strip-shaped with a length of 5-20 m. The length difference between the first electrode plates 1 and the second electrode plates 2 is within a preset range, and the width sizes are substantially the same. After a plurality of first electrode plates 1 and at least one second electrode plate 2 are superimposed, a winding structure can be obtained when the plurality of first electrode plates 1 and at least one second electrode plate 2 are wound along a strip direction. The winding structure has a winding axis K, and the superimposing surface in which the plurality of first electrode plates 1 are superimposed with the at least one second electrode plate 2 is substantially in parallel with the winding axis K.

In another embodiment of the present disclosure, the plurality of first electrode plates 1 and at least one second electrode plate 2 can be superimposed in multiple forms, for example, when the plurality of first electrode plates 1 are two or more first electrode plates 1 and the at least one second electrode plate 2 is also two or more second electrode plates 2, after the winding structure is flattened, one first electrode plate 1 and one second electrode plate 2 can be superimposed alternately in sequence. For another example, when the plurality of first electrode plates 1 are two or more first electrode plates 1 and the at least one second electrode plate 2 is one second electrode plate 2, after the winding structure is flattened, two or more first electrode plates 1 and one second electrode plate 2 can be superimposed alternately in sequence.

When a plurality of first electrode plates 1 are superimposed with at least one second electrode plate 2, a separator 3 is further arranged between any adjacent one first electrode plate 1 and one second electrode plate 2, and the separator 3 is configured to separate the adjacent first electrode plate 1 from the second electrode plate 2, such that the adjacent first electrode plate 1 and the second electrode plate 2 are not in short circuit with each other.

In another embodiment of the present disclosure, electrode plates of different polarities are adjacent to each other, for example, that is, the first electrode plates 1 being adjacent to the second electrode plates 2 means that no other electrode plate but at least one layer of separator 3 exists between the first electrode plates 1 and the second electrode plates 2, for example, no other first electrode plate 1 or second electrode plate 2 exists between the first electrode plates 1 and the second electrode plates 2, and can also be understood as that the first electrode plates 1 and the second electrode plates 2 are most directly adjacent to each other, for example, on the basis of one electrode plate with one polarity, the electrode plate with the polarity and the first layer of electrode plates with different polarities adjacent to the electrode plate with the polarity are called adjacent electrode plates.

In another embodiment of the present disclosure, two electrode plates of the same polarity being adjacent means that only one electrode plate of other polarity exists between two electrode plates of the same polarity, for example, two first electrode plates 1 being adjacent means that only one second electrode plate 2 exists between two first electrode plates 1, and two second electrode plates 2 being adjacent means that only one first electrode plate 1 exists between two second electrode plates 2. In another embodiment of the present disclosure, when no other electrode plate of a different polarity exists between two electrode plates of the same polarity, the two electrode plates of the same polarity can be taken as one electrode plate.

In another embodiment of the present disclosure, when no other electrode plates of a different polarity and separators exist between two or more electrode plates of the same polarity, the two electrode plates of the same polarity can be taken as one group of electrode plates, then during superimposing, the electrode plate group of the same polarity and another electrode plate group of a different polarity or a single electrode plate are superimposed alternately in sequence, for example, two or more first electrode plates constitute a first electrode plate group, and two or more second electrode plates constitute a second electrode plate group. The superimposing can be as follows: the first electrode plate group and the second electrode plate group are superimposed alternately in sequence, the first electrode plate group and a single second electrode plate are superimposed alternately in sequence, or, the second electrode plate group and the single first electrode plate are superimposed alternately in sequence.

Since the electrode plate group of the same polarity can be taken as one electrode plate, therefore, to facilitate description, one electrode plate described subsequently not only can be a single electrode plate, but also can be an electrode plate group composed of a plurality of electrode plates of the same polarity.

However, regardless of the superimposing manners, at least one layer of separator 3 is arranged between adjacent electrode plates of different polarities.

In another embodiment of the present disclosure, the separator 3 comprises a separator base layer and a functional layer, wherein the separator base layer can be at least one selected from polypropylene, polyethylene, ethylene-propylene copolymer, and polybutylene terephthalate, and the functional layer can be a mixture layer of ceramic oxides and binder. In another embodiment of the present disclosure, after the winding structure is flattened, the separator 3 is a thin film which exists separately, and is substantially strip-shaped, for example, a strip shape with a length of 5-20 m. In another embodiment of the present disclosure, the separator 3 is coated on the surface of the first electrode plates 1 and/or the second electrode plates 2, that is, the separator 3 and the first electrode plates 1 and/or the second electrode plates 2 are of an integrated structure.

In another embodiment of the present disclosure, as shown in FIG. 5, in the winding structure, the first electrode plates 1 and the second electrode plates 2 are superimposed alternately in sequence, wherein A-A is the direction at which a plurality of first electrode plates 1 are superimposed with at least one second electrode plate 2, and K is the winding axis K of the winding structure.

Figure 6:
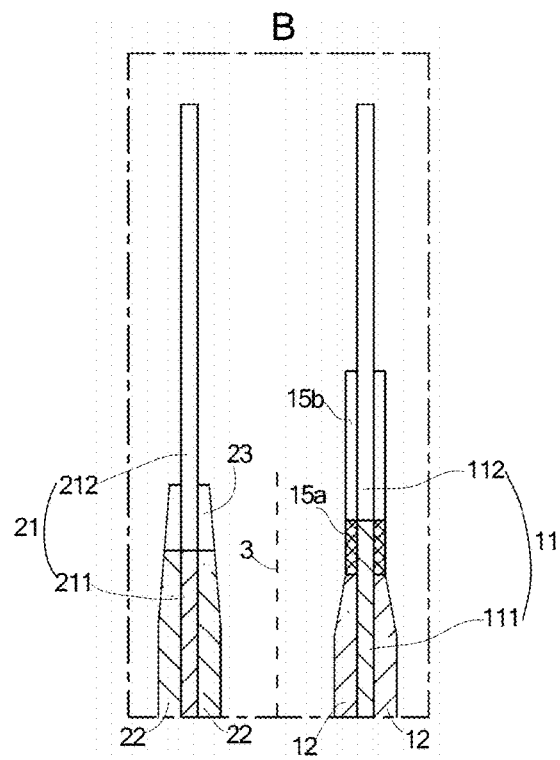
FIG. 6 is an enlarged structural diagram of part B of FIG. 5.

In another embodiment of the present disclosure, as shown in FIG. 6, each first electrode plate 1 in a plurality of first electrode plates 1 comprises a first current collector 11 and a first active substance layer 12 arranged on a superimposing surface of the first current collector 11, and the first current collector 11 comprises a first main body portion 111 provided with a first active substance layer 12 and at least one first tab 112 which protrudes from the first main body portion 111 along the direction of the winding axis K. Wherein the first tab 112 and the first main body portion 111 are arranged in parallel along the winding axis K. The second electrode plate 2 comprises a second current collector 21 and a second active substance layer 22 arranged on a superimposing surface of the second current collector 21, and the second current collector 21 comprises a second main body portion 211 provided with a second active substance layer 22 and a second tab 212 which protrudes from the second main body portion 211 along the direction of the winding axis K.

In another embodiment of the present disclosure, when a plurality of first electrode plates 1 and at least one second electrode plate 2 are superimposed, that is, in the winding structure, the first tab 112 of the first electrode plate 1 and the second tab 212 of the second electrode plate 2 not only can be arranged at the same side, along the winding axis K, of the winding structure, but also can be arranged at different sides.

In another embodiment of the present disclosure, any two first tabs 112 in all of the first tabs 112 are at least partially overlapped. For example, one electrode plate in the plurality of first electrode plates 1 is provided with a first tab 112, the other electrode plate in the plurality of first electrode plates 1 is provided with a first tab 112, the two first tabs 112 are at least partially overlapped. For another example, one of the electrode plates in the plurality of first electrode plates 1 is provided with a plurality of first tabs 112, and any two first tabs 112 in the above plurality of first tabs 112 are at least partially overlapped. For still another example, one of the electrode plate in the plurality of first electrode plates 1 is provided with a plurality of first tabs 112, the other electrode plate in the plurality of first electrode plates 1 is provided with a plurality of first tabs 112, any arbitrary first tab 112 of one of the electrode plates and any arbitrary first tab 112 of the other electrode plate are at least partially overlapped.

It can be known from the above description that, to achieve the same energy, the electrode assembly of the present embodiment is equivalent to be obtained when a single first electrode plate with the length being equal to the sum of lengths of a plurality of first electrode plates 1 is segmented into a plurality of first electrode plates 1 and then the plurality of first electrode plates 1 are wound in parallel. A plurality of electrode plates with the same polarity are available inside the electrode assembly of the present embodiment, and the internal resistance of the electrode assembly is smaller, thereby reducing the calorific value of the electrode assembly in the using process, and improving the performance of the electrode assembly.

Moreover, compared with alignment of a plurality of tabs on the electrode plates with the same polarity when a single electrode plate, with the length being equal to the sum of lengths of a plurality of first electrode plates 1, is wound, in the electrode assembly of the present embodiment, winding is performed after the tabs on a plurality of first electrode plates 1 with the same polarity are superimposed and aligned in parallel, the length of the electrode plate is shortened, and the number of winding turns is reduced, thereby improving the capability of controlling misplacement of tabs in the winding process, reducing the amount of misplacement between a plurality of first tabs 112 after winding, facilitating connection with the collector component, and further enhancing the over-current capacity of the tab, and improving the quality of the electrode assembly.

In addition, in the related technology, the area on a side, along a direction vertical to the winding axis K, of the first main body portion is not coated with an active substance layer, and the tab is welded to the area. While in the present embodiment, the first tab 112 and the first main body portion 111 are distributed in parallel along the winding axis K, and a first active substance layer is arranged in the direction, vertical to the winding axis K, of the first main body portion, thereby enlarging the area, coated with the first active substance layer 12, on the first current collector 11, and further improving the energy density of the electrode assembly.

Figure 7:
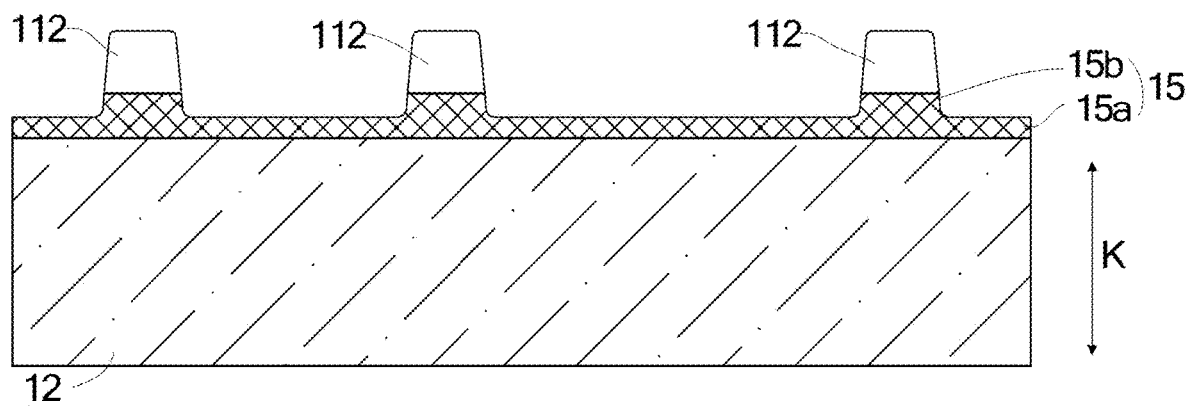
FIG. 7 is a structural schematic diagram of a first electrode plate in an electrode assembly of the present disclosure.

In another embodiment of the present disclosure, after the winding structure is flattened, the structure of the first electrode plate 1 is as shown in FIG. 7, each first electrode plate of the present embodiment comprises a plurality of first tabs 112, and through setting a plurality of first tabs 112, the over-current capacity can be improved.

In another embodiment of the present disclosure, the first tab 112 is formed by cutting the uncoated area of the first current collector 11. In the winding structure after winding, each first electrode plate 1 is provided with at least one first tab 112 on each of its circles. For example, each first electrode plate 1 is provided with a first tab 112 or two first tabs 112 on each of its circles.

In another embodiment of the present disclosure, after the electrode assembly 10 is wound and formed, a plurality of first tabs 112 are laminated together and are welded to the collector component 30.

To prevent unwelded areas of a plurality of first tabs 112 from being in a dispersed state after welding, meanwhile, since the first tab 112 is thin, in the assembly process of the battery, the first tab 112 is easily deformed and is squeezed between the first electrode plate 11 and the second electrode plate 12 to cause the risk of short circuit.

The first electrode plate 1 of the present embodiment is provided with an insulating layer 15 to play a role of insulation protection, for example, please refer to FIG. 7, the insulating layer 15 is arranged on the surface of a root part of the first tab 112, and the insulating layer 15 plays a role of insulation protection, even if when the first tab 112 is inserted between the first electrode plate 1 and the second electrode plate 2, the insulating layer 15 can also effectively isolate the first tab 112 from the second electrode plate 2 to reduce the risk of short circuit and improve the safety performance.

Please refer to FIG. 7, the insulating layer 15 comprises a first part 15a and a second part 15b, the first part 15a is arranged (for example, coated) on the superimposing surface of the first main body portion 111 and is connected to an end, adjacent to the first tab 112, of the first active substance layer 12, and the second part 15b extends from the end, far away from the first active substance layer 12, of the first part 15a and is arranged (for example, coated) on the superimposing surface of the first tab 112. The second part 15b can cover the root area, adjacent to the first main body portion 111, of the first tab 112, and effectively reduces the risk of contact between the root area of the first tab 112 and the first active substance layer 12.

For example, the first active substance layer 12 and the first part 15a are distributed, along two end sides of the winding axis K, of the superimposing surface of the first main body portion 111, and the first tab 112 and the first part 15a are arranged on the same end side of the first main body portion 111, for example, the first tab 112 extends from the first part 15a towards the outer side of the first main body portion 111 along the direction of the winding axis K.

For example, the first active substance layer 12 and the first part 15a being distributed on the superimposing surface of the first main body portion 111 along two end sides of the winding axis K can also be understood as follows: the first active substance layer 12 and the first part 15a are substantially parallel areas on the superimposing surface of the first main body portion 111 and are distributed in two layers on the superimposing surface of the first main body portion 111 along the winding axis K, that is, the first active substance layer 12 and the first part 15a are substantially parallel on the superimposing surface of the first main body portion 111 along the strip direction of the first electrode plate 1 and are distributed in two layers.

The insulating layer 15 comprises inorganic fillers and binder. The inorganic fillers include one or more of boehmite, aluminum oxide, magnesium oxide, titanium dioxide, zirconium oxide, silicon dioxide, silicon carbide, boron carbide, calcium carbonate, aluminum silicate, calcium silicate, potassium titanate, and barium sulfate. The binder comprises one or more of polyvinylidene fluoride, polyacrylonitrile, polyacrylic acid, polyacrylic ester, polyacrylate-acrylate, polyacrylonitrile-acrylic acid, and polyacrylonitrile-acrylic ester.

Any two first tabs in all of the first tabs of the present embodiment are at least partially overlapped. The number of winding turns of the electrode assembly 10 of the present embodiment is reduced, and the amount of misplacement between a plurality of first tabs 112 after winding can be reduced, thereby improving the over-current capacity of the tab.

Figure 8:
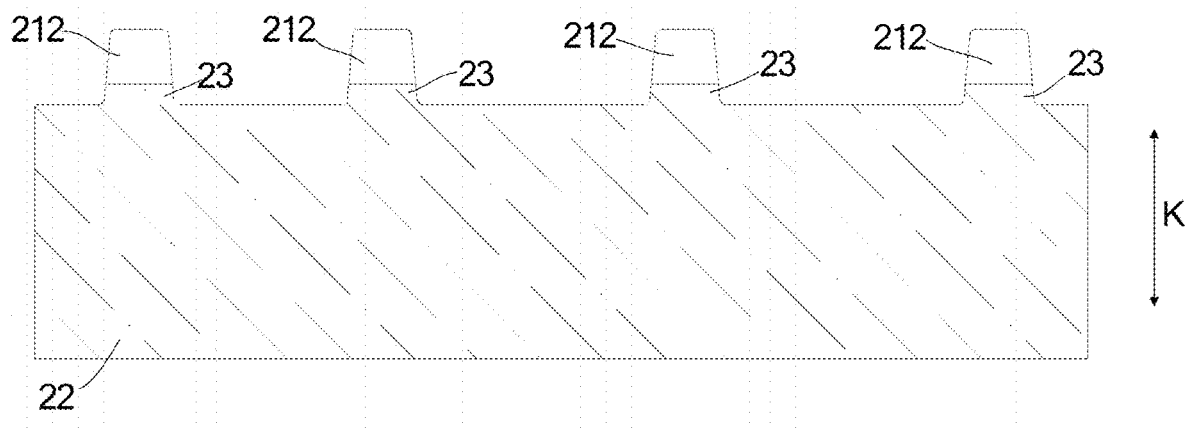
FIG. 8 is a structural schematic diagram of a second electrode plate in an electrode assembly of the present disclosure.

Before winding, the structure of the second electrode plate 2 is as shown in FIG. 8. The second electrode plate 12 of the present embodiment further comprises a third active substance layer 23, the third active substance layer 23 is arranged (for example, coated) on the area, connected with the second active substance layer 22, on the surface of the second tab 212, for example, the third active substance layer 23 is arranged (for example, coated) on the surface of the root part of the second tab 212. The third active substance layer 23 and the second active substance layer 22 are molded.

In the assembly process of the battery, the areas, uncoated with the third active substance layer 23, of a plurality of second tabs 212 are gathered and welded to the collector component 30. The third active substance layer 23 has a large elastic modulus, can effectively support the second tab 212, and reduce the risk of insertion of the second tab 212 between the first electrode plate 1 and the second electrode plate 2.

Specifically, the first current collector 11 of the present embodiment is an aluminum foil, the first active substance layer 12 comprises ternary materials, lithium manganate or lithium iron phosphate; and the second current collector 21 is a copper foil, and the second active substance layer 22 comprises graphite or silicon.

In the present embodiment, a plurality of first electrode plates 1 and a plurality of second electrode plates 2 are available, for example, the number of the first electrode plates 1 and the second electrode plates 2 can be selected to be 2 to 3, to ensure easy winding on the basis of reducing the length of the electrode plate, and prevent a dramatic increase in the required winding force when the number of the electrode plates is large, or prevent falling off of the active substance coated on the surface of the electrode plate.

The winding structure of the electrode assembly of the present embodiment is flat and comprises a straight section and turning sections arranged on two sides of the straight section. The superimposing surfaces of the electrode plates in the straight section are substantially parallel and are substantially parallel with the winding axis K, the straight section comprises, in the plane vertical to the winding axis K, a first straight sub-section and a second straight sub-section which are substantially parallel and which are distributed in symmetry about the winding axis K, and the two turning sections are respectively arranged in the first straight sub-section and the second straight sub-section to combine into two sides of the straight section.

All of the first tabs 112 in the present embodiment are arranged in the straight section. In this way, when a plurality of first tabs 112 are arranged in a laminated manner and are connected, the contact area between the first tabs 112 is enlarged, and the over-current capacity is enhanced. Moreover, further, all of the first tabs 112 of the present embodiment are arranged in the first straight sub-section, thereby reducing the thickness after the first tabs 112 are superimposed when ensuring the over-current capacity of the first tab 112, and further reducing the space occupied by the first tab 112.

In the embodiments not shown in other drawings, all of the first tabs can also be arranged in the second straight sub-section. Or a part of all of the first tabs are arranged in the first straight sub-section, and the other part of the first tabs are arranged in the second straight sub-section.

In another embodiment of the present disclosure, the electrode assembly 10 comprises a plurality of first electrode plates 1, and the positions of the winding initial ends of at least two first electrode plates 1 in the plurality of first electrode plates 1 are different. Moreover, the positions of the winding tail ends of at least two first electrode plates 1 in the plurality of first electrode plates 1 are different. For example, the positions of the winding initial ends of all of the first electrode plates 1 are different, and the positions of the winding tail ends are different.

In another embodiment of the present disclosure, the electrode assembly 10 comprises a plurality of second electrode plates 2, and the positions of the winding initial ends of at least two second electrode plates 2 in the plurality of second electrode plates 2 are different. Moreover, the positions of the winding tail ends of at least two second electrode plates 2 in the plurality of second electrode plates 2 are different. For example, the positions of the winding initial ends of all of the second electrode plates 2 are different, and the positions of the winding tail ends are different.

The electrode assembly 10 will expand during the using process, and will exert an acting force onto the case 20 after the electrode assembly 10 expands, meanwhile, the case 20 exerts a counter-acting force onto the electrode assembly 10. As to the electrode assembly 10 of the present disclosure, the number of layers of the first electrode plates 1 and the second electrode plates 2 is increased, such a structure can prevent the formation of a thick step at the winding tail end E of a plurality of first electrode plates 1 or a plurality of second electrode plates 2, when the outer layer of the winding structure is subjected to a counter-acting force of the case 20, the problem of concentration of stress at the winding tail end E of the electrode plate can be alleviated, such that the winding structure is subjected to a uniform stress at different circumferential positions, thereby preventing great deformation of the winding structure or preventing falling off of active substance at partial areas with a large stress, and improving the operating performance and reliability of the battery after long-term use.

In another embodiment of the present disclosure, the electrode assembly comprises a plurality of first electrode plates 1 and a plurality of second electrode plates 2, the positions of the winding initial ends S of at least two first electrode plates 1 in the plurality of first electrode plates 1 are different, for example, the positions of the winding initial ends S of all of the first electrode plates 1 are different; and/or, the positions of the winding initial ends S' of at least two second electrode plates 2 in the plurality of second electrode plates 2 are different, for example, the positions of the winding initial ends S' of all of the second electrode plates 2 are different.

The electrode assembly 10 will expand during the using process, as to the electrode assembly 10 of the present disclosure, the positions of the respective first winding initial end S of at least two first electrode plates 1 are set to be different, and/or the positions of the respective second winding initial end S' of at least two second electrode plates 2 are set to be different, that is, the first winding initial ends S of at least two first electrode plates 1 are arranged in a staggered manner in the circumferential direction of the winding structure, and/or the second winding initial ends S' of at least two second electrode plates 2 are arranged in a staggered manner in the circumferential direction of the winding structure, such that the positions of the winding initial ends of the first electrode plates 1 and/or the second electrode plates 2 are different, and the formation of a thick step at the winding initial ends of the plurality of first electrode plates 1 or the plurality of second electrode plates 2 can be prevented, the problem of concentration of stress at the winding initial ends of the electrode plates can be alleviated, such that the winding structure is subjected to a uniform stress at different circumferential positions, thereby preventing great deformation of the winding structure or preventing falling off of active substance at partial areas with a large stress, and improving the operating performance and reliability of the battery after long-term use.

In another embodiment of the present disclosure, the winding tail ends of at least one first electrode plate 1 in a plurality of first electrode plates 1 are arranged in the turning section. The winding tail ends of at least one second electrode plate 2 in the plurality of second electrode plates 2 are arranged in the turning section.

When the winding tail ends of the first electrode plate 1 and the second electrode plate 2 are both arranged in the turning section, the difference between the number of layers of the electrode plates of the first straight sub-section and the second straight sub-section can be reduced, when the electrode assembly 10 expands and is in contact with the case 20, and when an inner wall of the case 20 exerts a counter-acting force onto two planes of the electrode assembly 10, the stress applied to the electrode plates of the first straight sub-section and the second straight sub-section is consistent.

In another embodiment of the present disclosure, in different radial directions of the winding structure, the difference of the number of layers of electrode plates does not exceed the number of preset layers. For example, the number of preset layers is smaller than or equal to the sum of the number of the plurality of first electrode plates 1 and the plurality of second electrode plates 2, for example, after two first electrode plates 1 and two second electrode plates 2 are wound, in one of the radial directions of the winding structure, the number of layers of electrode plates is 8, in another radial direction of the winding structure, the number of the layers of electrode plates is 8 to the minimum, and 12 to the maximum, that is, the number of preset layers is smaller than or equal to the sum of the number of two first electrode plates 1 and two second electrode plates 2, wherein the sum is 4.

When the electrode assembly 10 expands and is in contact with the case 20, the case 20 will exert a counter-acting force onto the electrode assembly 10, when the difference of number of layers of electrode plates does not exceed the number of preset layers in different radial directions of the winding structure, the stress on the electrode assembly 10 at each point of the circumferential direction is more uniform, thereby preventing larger difference of performances at various points of the electrode assembly 10 in the using process. For example, two first electrode plates 1 are arranged, two second electrode plates 2 are arranged, the number of preset layers is smaller than or equal to four, the smaller the difference of the number of layers of the electrode plates is, the more uniform the stress on the electrode assembly 10 at each point of the circumferential direction of the winding structure is.

The electrode assembly 10 can include at least two first electrode plates 1 and at least two second electrode plates 2, however, to facilitate description, two first electrode plates 1 and two second electrode plates 2 are taken as an example for illustration in the following embodiments.

The external shape of the winding structure of the electrode assembly 10 can be a cylindrical shape, a flat shape, an ellipsoid shape, a cube shape, a cuboid shape or other arbitrary shapes. However, to facilitate description, the winding structure of the electrode assembly 10 being a flat shape and a cylinder shape is respectively taken as an example for illustration below.

Figure 9:
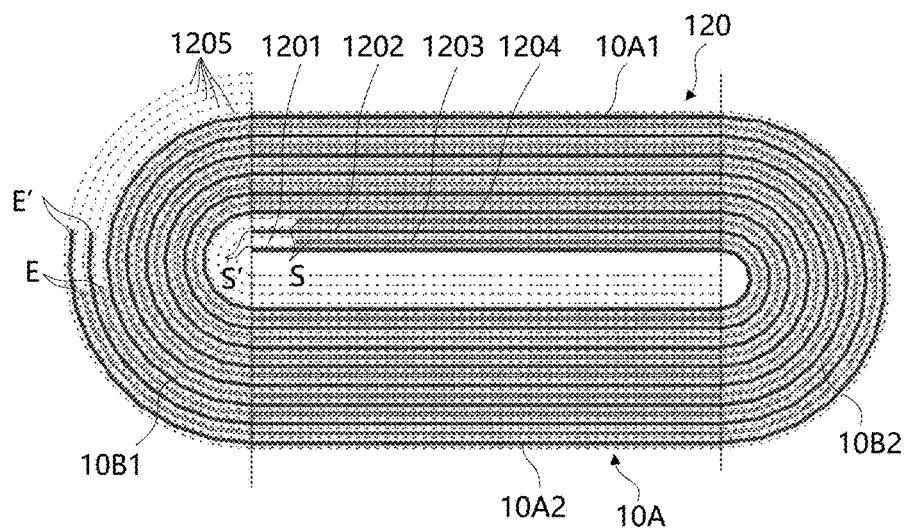
FIG. 9, FIG. 10, FIG. 11, FIG. 12 and FIG. 13 are respectively sectional views of a first embodiment, a second embodiment, a third embodiment, a fourth embodiment and a fifth embodiment of a flat electrode assembly of the present disclosure in a plane vertical to a winding axis.

FIG. 9 is a structural schematic diagram showing that a flat electrode assembly in another embodiment of the present disclosure is vertical to the cross section of the winding axis K. The electrode assembly 120 comprises a first negative electrode plate 1201, a second negative electrode plate 1202, a first positive electrode plate 1203, a second negative electrode plate 1204 and a plurality of separators 1205, wherein the first negative electrode plate 1201, the first positive electrode plate 1203, the second negative electrode plate 1202 and the second positive electrode plate 1204 are superimposed alternately in sequence, and the first negative electrode plate 1201 is separated from the first positive electrode plate 1203 through a separator 1205, the first positive electrode plate 1203 is separated from the second negative electrode plate 1202 through another separator 1205, the second negative electrode plate 1202 is separated from the second positive electrode plate 1204 through another separator 1205, and all of the first negative electrode plates 1201, the second negative electrode plates 1202, the first positive electrode plates 1203, the second positive electrode plates 1204 and the plurality of separators 1205 are superimposed and then wound around the winding axis K to form a flat winding structure.

In the electrode assembly 120 in the present embodiment, as to the structures and positions of the tabs of the positive electrode plates and the tabs of the negative electrode plate, please refer to the related contents of the first tabs of the first electrode plates and the second tabs of the second electrode plates described in the above embodiments of FIG. 5 to FIG. 8, which will not be repeated redundantly herein.

In the present embodiment, as to the following specific conditions: on different radial directions of the winding structure of the electrode assembly 120, that is, at different positions of the circumferential direction of the winding structure, the difference between the number of layers of electrode plates is no greater than the number of preset layers, please also refer to the related contents described in the above embodiments of FIG. 5 to FIG. 8, which will not be repeated redundantly herein.

In the winding structure, the innermost ring in the winding structure is a ring enclosed by the first negative electrode plates 1201, and the outermost ring of the winding structure is a ring enclosed by the second negative electrode plates 1202.

In the present embodiment, the winding structure of the electrode assembly 120 comprises a straight section 10A and turning sections 10B arranged on two sides of the straight section 10A, wherein the superimposing surface of the electrode plate in the straight section 10A is a substantially parallel plane and is substantially in parallel with the winding axis, the plane herein is not exactly a plane, and a certain error is allowed. In a plane vertical to the winding axis K, the straight section 10A comprises a first straight sub-section 10A1 and a second straight sub-section 10A2 which are substantially parallel and distributed symmetrically about the winding axis K, and the two turning sections 10B are respectively arranged in the first straight sub-section 10A1 and the second straight sub-section 10A2 to combine into two sides of the straight section 10A.

In the winding structure of the electrode assembly, all of the negative tabs of the first negative electrode plate 1201 and all of the negative tabs of the second negative electrode plate 1202 can all be arranged in the straight section 10A, for example, all of the negative tabs are arranged in the first straight sub-section 10A1 or all of the negative tabs are arranged in the second straight sub-section 10A2, or, part of the negative tabs are arranged in the first straight sub-section 10A1, and the other part of the negative tabs are arranged in the second straight sub-section 10A2, however, the negative tabs arranged in the same area are at least partially overlapped in the direction vertical to the winding axis, for example, they are substantially overlapped.

All of the positive tabs of the first positive electrode plate 1203 and all of the positive tabs of the second positive electrode plate 1204 can all be arranged in the straight section 10A, for example, all of the positive tabs are arranged in the first straight sub-section 10A1 or all of the positive tabs are arranged in the second straight sub-section 10A2, or, part of the positive tabs are arranged in the first straight sub-section 10A1, and the other part of the positive tabs are arranged in the second straight sub-section 10A2, however, the positive tabs arranged in the same area are at least partially overlapped in the direction vertical to the winding axis, for example, they are substantially overlapped.

The positions of the first winding initial ends S of the first positive electrode plates 1203 and the second positive electrode plates 1204 are the same, for example, the first winding initial ends S of the first positive electrode plates 1203 and the second positive electrode plates 1204 are both arranged in the straight sub-section (for example, the first straight sub-section 10A1) on the same side of the straight section 10A, and the first winding initial ends S of the first positive electrode plates 1203 and the second positive electrode plates 1204 are flush.

The positions of the second winding initial ends S' of the first negative electrode plate 1201 and the second negative electrode plate 1202 are also the same, for example, the second winding initial ends S' of the first negative electrode plate 1201 and the second negative electrode plate 1202 are both arranged in the straight sub-section (for example, the first straight sub-section 10A1) on the same side of the straight section 10A, and the second winding initial ends S' of the first negative electrode plate 1201 and the second negative electrode plate 1202 are flush.

Along a reverse direction of the winding direction, the second winding initial end S' of the first negative electrode plate 1201 exceeds the first winding initial end S of the first positive electrode plate 1204. The second winding initial end S' of the second negative electrode plate 1202 exceeds the first winding initial end S of the second positive electrode plate 1203.

The positions of the first winding tail ends E of the first positive electrode plates 1203 and the second positive electrode plates 1204 are the same, for example, the first winding tail ends E of the first positive electrode plates 1203 and the second positive electrode plates 1204 are both arranged at the turning section (for example, the first turning section 10B1) on the same side, and the first winding tail ends E of the first positive electrode plates 1203 and the second positive electrode plates 1204 are flush.

The positions of the second winding tail ends E' of the first negative electrode plate 1201 and the second negative electrode plate 1202 are also the same, for example, the second winding tail ends E' of the first negative electrode plate 1201 and the second negative electrode plate 1202 are both arranged in the turning section (for example, the first turning section 10B1) on the same side, and are also arranged at the turning section (for example, the first turning section 10B1) of the same side as the first winding tail ends E of the first positive electrode plates 1203 and the second positive electrode plates 1204, and the second winding tail ends E' of the first negative electrode plate 1201 and the second negative electrode plate 1202 are flush.

Along a winding direction, the second winding tail end E' of the first negative electrode plate 1201 exceeds the first winding tail end E of the second positive electrode plate 1204, and the second winding tail end E' of the second negative electrode plate 1202 exceeds the first winding tail end E of the first positive electrode plate 1203.

The winding structure of the electrode assembly described above can enable the length differences of a plurality of electrode plates before winding to be approximate, thereby being easy to wind.

Figure 10:
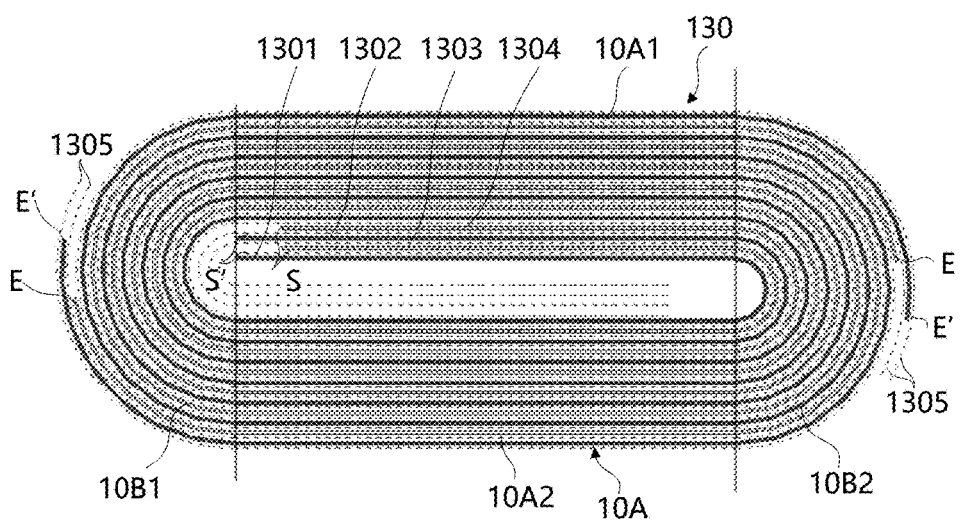

FIG. 10 is a structural schematic diagram showing that a flat electrode assembly is vertical to the cross section of the winding axis K in another embodiment of the present disclosure. The electrode assembly 130 comprises a first negative electrode plate 1301, a second negative electrode plate 1302, a first positive electrode plate 1303, a second positive electrode plate 1304 and a plurality of separators 1305, wherein the first negative electrode plate 1301, the first positive electrode plate 1303, the second negative electrode plate 1302 and the second positive electrode plate 1304 are superimposed alternately in sequence, and the first negative electrode plate 1301 is separated from the first positive electrode plate 1303 through a separator 1305, the first positive electrode plate 1303 is separated from the second negative electrode plate 1302 through another separator 1305, the second negative electrode plate 1302 is separated from the second positive electrode plate 1304 through another separator 1305, and all of the first negative electrode plates 1301, the second negative electrode plates 1302, the first positive electrode plates 1303, the second positive electrode plates 1304 and a plurality of separators 1305 are superimposed and then wound around a winding axis K to form a flat winding structure.

In the winding structure of the electrode assembly, all of the negative tabs of the first negative electrode plate 1301 and all of the negative tabs of the second negative electrode plate 1302 can all be arranged in the straight section 10A, for example, all of the negative tabs are arranged in the first straight sub-section 10A1 or all of the negative tabs are arranged in the second straight sub-section 10A2, or, part of the negative tabs are arranged in the first straight sub-section 10A1, and the other part of the negative tabs are arranged in the second straight sub-section 10A2, however, the negative tabs arranged in the same area are at least partially overlapped in the direction vertical to the winding axis, for example, they are substantially overlapped.

All of the positive tabs of the first positive electrode plate 1303 and all of the positive tabs of the second positive electrode plate 1304 can all be arranged in the straight section 10A, for example, all of the positive tabs are arranged in the first straight sub-section 10A1 or all of the positive tabs are arranged in the second straight sub-section 10A2, or, part of the positive tabs are arranged in the first straight sub-section 10A1, and the other part of the positive tabs are arranged in the second straight sub-section 10A2, however, the positive tabs arranged in the same area are at least partially overlapped in the direction vertical to the winding axis, for example, they are substantially overlapped. The structure of the electrode assembly 130 of the present embodiment is substantially similar to the structure of the electrode assembly described in the embodiment of FIG. 9, and the difference will be described below.

In the winding structure of the electrode assembly 130 of the present embodiment, the innermost ring in the winding structure is a ring enclosed by the first negative electrode plates 1301, and the outermost ring of the winding structure is a ring enclosed jointly by the first negative electrode plates 1301 and the second negative electrode plates 1302.

The first winding tail ends E of the first positive electrode plates 1303 and the second positive electrode plates 1304 are different, for example, the first winding tail ends E of the first positive electrode plates 1303 and the second positive electrode plates 1304 are respectively arranged at the second turning section 10B2 and the first turning section 10B1.

The positions of the second winding tail ends E' of the first negative electrode plate 1301 and the second negative electrode plate 1302 are also different, for example, the second winding tail ends E' of the first negative electrode plate 1301 and the second negative electrode plate 1302 are respectively arranged at the first turning section 10B1 and the second turning section 10B2.

Along a winding direction, the second winding tail end E' of the first negative electrode plate 1301 exceeds the first winding tail end E of the second positive electrode plate 1304, and the second winding tail end E' of the second negative electrode plate 1302 exceeds the first winding tail end E of the first positive electrode plate 1303.

The winding structure of the electrode assembly described above can reduce the step formed by the first positive electrode plate 1303 and the second positive electrode plate 1304 at the first winding tail end E, and reduce the step formed by the first negative electrode plate 1301 and the second negative electrode plate 1302 at the second winding tail end E', so as to reduce local stress exerted onto the electrode plate at the winding tail end after the electrode assembly is in contact with the housing when the electrode assembly expands, prevent cracking of the electrode plate or falling off of the active substance, and improve the reliability of long-term operation of the electrode assembly.

Figure 11:
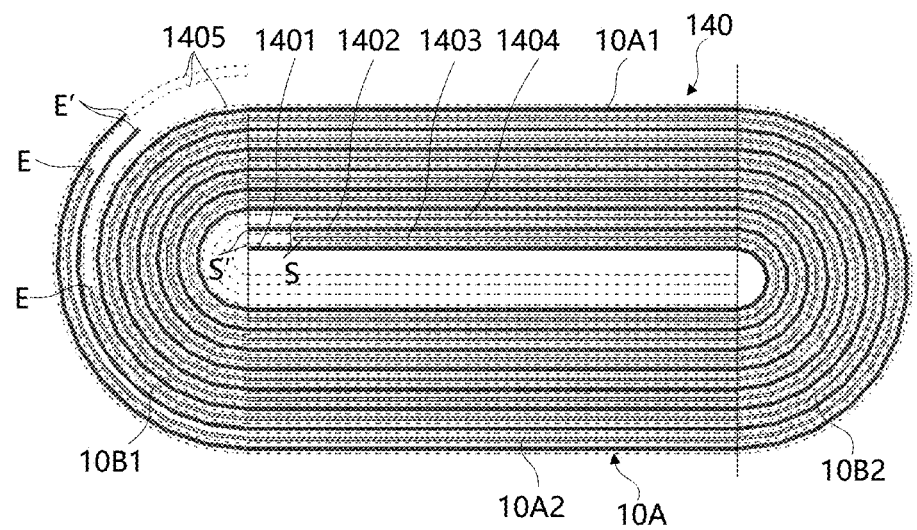

FIG. 11 is a structural schematic diagram showing that a flat electrode assembly is vertical to the cross section of the winding axis K in another embodiment of the present disclosure. The electrode assembly 140 comprises a first negative electrode plate 1401, a second negative electrode plate 1402, a first positive electrode plate 1403, a second positive electrode plate 1404 and a plurality of separators 1405, wherein the first negative electrode plate 1401, the first positive electrode plate 1403, the second negative electrode plate 1402 and the second positive electrode plate 1404 are superimposed alternately in sequence, and the first negative electrode plate 1401 is separated from the first positive electrode plate 1403 through a separator 1405, the first positive electrode plate 1403 is separated from the second negative electrode plate 1402 through another separator 1405, the second negative electrode plate 1402 is separated from the second positive electrode plate 1404 through another separator 1405, and all of the first negative electrode plates 1401, the second negative electrode plates 1402, the first positive electrode plates 1403, the second positive electrode plates 1404 and the plurality of separators 1405 are superimposed and then wound around a winding axis K to form a flat winding structure.

In the winding structure of the electrode assembly, all of the negative tabs of the first negative electrode plate 1401 and all of the negative tabs of the second negative electrode plate 1402 can all be arranged in the straight section 10A, for example, all of the negative tabs are arranged in the first straight sub-section 10A1 or all of the negative tabs are arranged in the second straight sub-section 10A2, or, part of the negative tabs are arranged in the first straight sub-section 10A1, and the other part of the negative tabs are arranged in the second straight sub-section 10A2, however, the negative tabs arranged in the same area are at least partially overlapped in the direction vertical to the winding axis, for example, they are substantially overlapped.

All of the positive tabs of the first positive electrode plate 1403 and all of the positive tabs of the second positive electrode plate 1404 can all be arranged in the straight section 10A, for example, all of the positive tabs are arranged in the first straight sub-section 10A1 or all of the positive tabs are arranged in the second straight sub-section 10A2, or, part of the positive tabs are arranged in the first straight sub-section 10A1, and the other part of the positive tabs are arranged in the second straight sub-section 10A2, however, the positive tabs arranged in the same area are at least partially overlapped in the direction vertical to the winding axis, for example, they are substantially overlapped.

The structure of the electrode assembly 140 of the present embodiment is substantially similar to the structure of the electrode assembly 10 described in the embodiment of FIG. 9, and the difference will be described below.

In the winding structure of the electrode assembly 140 of the present embodiment, the innermost ring in the winding structure is a ring enclosed by the first negative electrode plates 1401, and the outermost ring of the winding structure is a ring enclosed by the second negative electrode plates 1402.

In the winding structure of the electrode assembly of the present embodiment, the positions of the second winding tail ends E' of the first negative electrode plate 1401 and the second negative electrode plate 1402 are different, for example, the second winding tail ends E' of the first negative electrode plate 1401 and the second negative electrode plate 1402 are all arranged at the same turning section (for example, the first turning section 10B1), and the second winding tail ends E' of the first negative electrode plate 1401 and the second negative electrode plate 1402 are not flush.

The winding structure of the electrode assembly 140 described above can reduce the difference between the number of layers of electrode plates of the first straight sub-section 14A1 and the second straight sub-section 14A2. When the electrode assembly expands and is in contact with the housing, and when the inner wall of the housing exerts a counter-acting force onto the two planes of the electrode assembly, the stress exerted onto the electrode plates of the first straight sub-section 14A1 and the second straight sub-section 14A2 is consistent.

Figure 12:
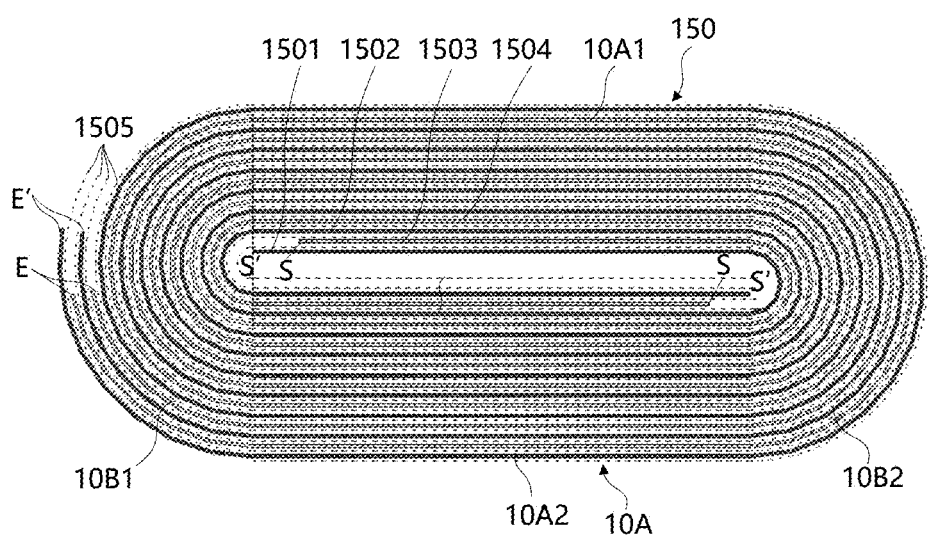

FIG. 12 is a structural schematic diagram showing that a flat electrode assembly is vertical to the cross section of the winding axis K in another embodiment of the present disclosure. The electrode assembly 150 comprises a first negative electrode plate 1501, a second negative electrode plate 1502, a first positive electrode plate 1503, a second positive electrode plate 1504 and a plurality of separators 1505, wherein the first negative electrode plate 1501, the first positive electrode plate 1503, the second negative electrode plate 1502 and the second positive electrode plate 1504 are superimposed alternately in sequence, and the first negative electrode plate 1501 is separated from the first positive electrode plate 1503 through a separator 1505, the first positive electrode plate 1503 is separated from the second negative electrode plate 1502 through another separator 1505, the second negative electrode plate 1502 is separated from the second positive electrode plate 1504 through another separator 1505, and all of the first negative electrode plates 1501, the second negative electrode plates 1502, the first positive electrode plates 1503, the second positive electrode plates 1504 and the plurality of separators 1505 are superimposed and then wound around a winding axis K to form a flat winding structure.

In the winding structure of the electrode assembly, all of the negative tabs of the first negative electrode plate 1501 and all of the negative tabs of the second negative electrode plate 1502 can all be arranged in the straight section 10A, for example, all of the negative tabs are arranged in the first straight sub-section 10A1 or all of the negative tabs are arranged in the second straight sub-section 10A2, or, part of the negative tabs are arranged in the first straight sub-section 10A1, and the other part of the negative tabs are arranged in the second straight sub-section 10A2, however, the negative tabs arranged in the same area are at least partially overlapped in the direction vertical to the winding axis, for example, they are substantially overlapped.

All of the positive tabs of the first positive electrode plate 1503 and all of the positive tabs of the second positive electrode plate 1504 can all be arranged in the straight section 10A, for example, all of the positive tabs are arranged in the first straight sub-section 10A1 or all of the positive tabs are arranged in the second straight sub-section 10A2, or, part of the positive tabs are arranged in the first straight sub-section 10A1, and the other part of the positive tabs are arranged in the second straight sub-section 10A2, however, the positive tabs arranged in the same area are at least partially overlapped in the direction vertical to the winding axis, for example, they are substantially overlapped.

The structure of the electrode assembly 10 of the present embodiment is substantially similar to the structure of the electrode assembly 10 described in the embodiment of FIG. 9, and the difference will be described below. In the winding structure of the electrode assembly of the present embodiment, the innermost ring in the winding structure is a ring enclosed jointly by the first negative electrode plates 1501 and the second negative electrode plates 1502, and the outermost ring of the winding structure is a ring enclosed by the second negative electrode plates 1502.

In the winding structure of the electrode assembly 150 of the present embodiment, the positions of the first winding initial ends S of the first positive electrode plates 1503 and the second positive electrode plates 1504 are different, for example, the first winding initial ends S of the first positive electrode plates 1503 and the second positive electrode plates 1504 are respectively arranged at the first straight sub-section 10A1 and the second straight sub-section 10A2, and the first winding initial ends S of the first positive electrode plates 1503 and the second positive electrode plates 1504 are not flush.

The positions of the second winding initial ends S of the first negative electrode plate 1501 and the second negative electrode plate 1502 are also different, for example, the second winding initial ends S of the first negative electrode plate 1501 and the second negative electrode plate 1502 are respectively arranged at the first straight sub-section 10A1 and the second straight sub-section 10A2, and the second winding initial ends S of the first negative electrode plate 1501 and the second negative electrode plate 1502 are not flush.

The winding structure of the electrode assembly described above can reduce the step formed by the first positive electrode plates 1503 and the second positive electrode plates 1504 at the first winding initial end S, and reduce the step formed by the first negative electrode plate 1501 and the second negative electrode plate 1502 at the second winding initial end S', so as to reduce local stress exerted onto the electrode plate at the winding initial end after the electrode assembly expands and is in contact with the housing 20, prevent cracking of the electrode plate or falling off of the active substance, and improve the reliability of long-term operation of the electrode assembly.

Figure 13:
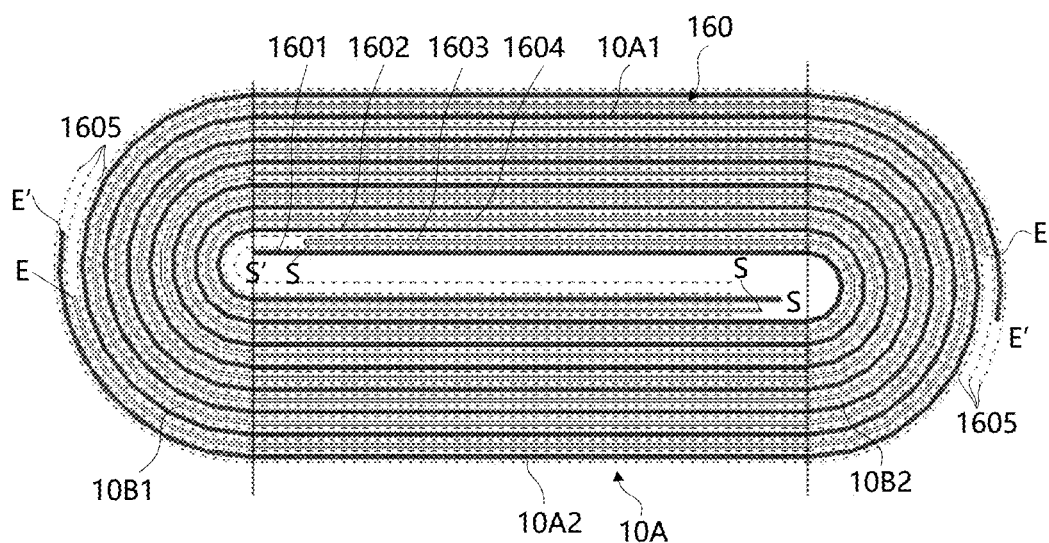

FIG. 13 is a structural schematic diagram showing that a flat electrode assembly is vertical to the cross section of the winding axis K in another embodiment of the present disclosure. The electrode assembly 160 comprises a first negative electrode plate 1601, a second negative electrode plate 1602, a first positive electrode plate 1603, a second positive electrode plate 1604 and a plurality of separators 1605, wherein the first negative electrode plate 1601, the first positive electrode plate 1603, the second negative electrode plate 1602 and the second positive electrode plate 1604 are superimposed alternately in sequence, and the first negative electrode plate 1601 is separated from the first positive electrode plate 1603 through a separator 1605, the first positive electrode plate 1603 is separated from the second negative electrode plate 1602 through another separator 1605, the second negative electrode plate 1602 is separated from the second positive electrode plate 1604 through another separator 1605, and all of the first negative electrode plates 1601, the second negative electrode plates 1602, the first positive electrode plates 1603, the second positive electrode plates 1604 and the plurality of separators 1605 are superimposed and then wound around a winding axis K to form a flat winding structure.

In the winding structure of the electrode assembly, all of the negative tabs of the first negative electrode plate 1601 and all of the negative tabs of the second negative electrode plate 1602 can all be arranged in the straight section 10A, for example, all of the negative tabs are arranged in the first straight sub-section 10A1 or all of the negative tabs are arranged in the second straight sub-section 10A2, or, part of the negative tabs are arranged in the first straight sub-section 10A1, and the other part of the negative tabs are arranged in the second straight sub-section 10A2, however, the negative tabs arranged in the same area are at least partially overlapped in the direction vertical to the winding axis, for example, they are substantially overlapped.

All of the positive tabs of the first positive electrode plate 1603 and all of the positive tabs of the second positive electrode plate 1604 can all be arranged in the straight section 10A, for example, all of the positive tabs are arranged in the first straight sub-section 10A1 or all of the positive tabs are arranged in the second straight sub-section 10A2, or, part of the positive tabs are arranged in the first straight sub-section 10A1, and the other part of the positive tabs are arranged in the second straight sub-section 10A2, however, the positive tabs arranged in the same area are at least partially overlapped in the direction vertical to the winding axis, for example, they are substantially overlapped.

The structure of the electrode assembly 160 of the present embodiment is substantially similar to the structure of the electrode assembly 10 described in the embodiment of FIG. 9, and the difference will be described below. In the winding structure of the electrode assembly 10 of the present embodiment, the innermost ring in the winding structure is a ring enclosed jointly by the first negative electrode plates 1601 and the second negative electrode plates 1602, and the outermost ring of the winding structure is a ring enclosed jointly by the first negative electrode plates 1601 and the second negative electrode plates 1602.

In the winding structure of the electrode assembly 160 of the present embodiment, the positions of the first winding initial ends S of the first positive electrode plates 1603 and the second positive electrode plates 1604 are different, for example, the first winding initial ends S of the first positive electrode plates 1603 and the second positive electrode plates 1604 are respectively arranged at the first straight sub-section 10A1 and the second straight sub-section 10A2, and the first winding initial ends S of the first positive electrode plates 1603 and the second positive electrode plates 1604 are not flush.

The positions of the second winding initial ends S' of the first negative electrode plate 1601 and the second negative electrode plate 1602 are also different, for example, the second winding initial ends S' of the first negative electrode plate 1601 and the second negative electrode plate 1602 are respectively arranged at the first straight sub-section 10A1 and the second straight sub-section 10A2, and the second winding initial ends S' of the first negative electrode plate 1601 and the second negative electrode plate 1602 are not flush.

The positions of the first winding tail ends E of the first positive electrode plates 1603 and the second positive electrode plates 1604 are different, for example, the first winding tail ends E of the first positive electrode plates 1603 and the second positive electrode plates 1604 are respectively arranged at different turning sections 10B, and the first winding tail ends E of the first positive electrode plates 1603 and the second positive electrode plates 1604 are not flush.

The positions of the second winding tail ends E' of the first negative electrode plate 1601 and the second negative electrode plate 1602 are also different, for example, the second winding tail ends E' of the first negative electrode plate 1601 and the second negative electrode plate 1602 are respectively arranged at two different turning sections 10B, and the second winding tail ends E' of the first negative electrode plate 1601 and the second negative electrode plate 1602 are not flush.

The winding structure of the electrode assembly described above can simultaneously reduce the steps formed by the first positive electrode plates 1603 and the second positive electrode plates 1604 at the first winding initial end S and the first winding tail end E, and reduce the steps formed by the first negative electrode plates 1601 and the second negative electrode plates 1602 at the second winding initial end S' and the second winding tail end E', so as to reduce local stress exerted onto the electrode plate at the winding initial end and the winding tail end after the electrode assembly expands and is in contact with the housing 20, prevent cracking of the electrode plate or falling off of the active substance, and improve the reliability of long-term operation of the electrode assembly.

On the basis of the above embodiments, on different radial directions of the winding structure, that is, at different circumferential positions of the winding structure, the difference of number of layers of electrode plates does not exceed a preset number of layers, the number of layers of electrode plates herein refers to the total number of layers of the positive electrode plates and negative electrode plates. Wherein the preset number of layers is smaller than or equal to the sum of the quantity of a plurality of positive electrode plates and the quantity of a plurality of negative electrode plates.

When the electrode assembly expands and is in contact with the housing 20, the housing 20 will exert a counter-acting force onto the electrode assembly, such that the stress on each point of the circumferential direction of the electrode assembly is more uniform, thereby preventing the electrode assembly from having great difference in performances at various points in the using process. For example, two positive electrode plates are arranged, two negative electrode plates are arranged, the preset number of layers is smaller than or equal to four, and the smaller the difference of the number of layers of electrode plates is, the more uniform the stress exerted onto the electrode assembly at each point of the circumferential direction is.

FIG. 14 to FIG. 17 are structural schematic diagrams of a cylindrical electrode assembly.

Figure 14:
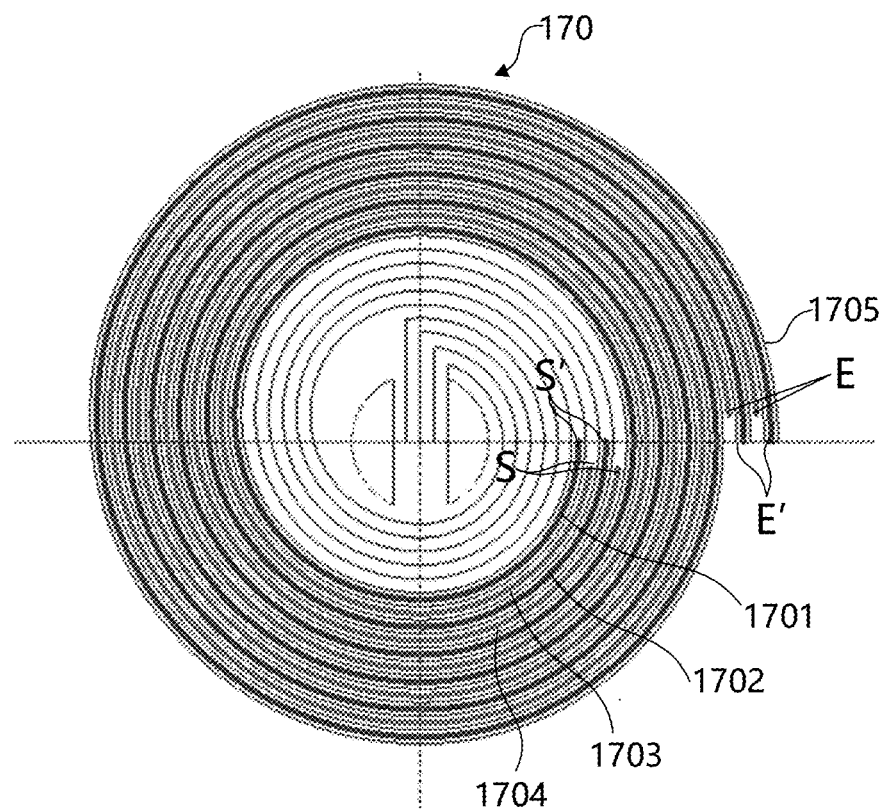
FIG. 14, FIG. 15, FIG. 16 and FIG. 17 are respectively sectional views of a first embodiment, a second embodiment, a third embodiment and a fourth embodiment of a cylindrical electrode assembly of the present disclosure in a plane vertical to a winding axis.

FIG. 14 is a structural schematic diagram showing that a cylindrical electrode assembly is vertical to the cross section of the winding axis K in another embodiment of the present disclosure. The electrode assembly 170 comprises a first negative electrode plate 1701, a second negative electrode plate 1702, a first positive electrode plate 1703, a second positive electrode plate 1704 and a plurality of separators 1705, wherein the first negative electrode plate 1701, the first positive electrode plate 1703, the second negative electrode plate 1702 and the second positive electrode plate 1704 are superimposed alternately in sequence, and the first negative electrode plate 1701 is separated from the first positive electrode plate 1703 through a separator 1705, the first positive electrode plate 1703 is separated from the second negative electrode plate 1702 through another separator 1705, the second negative electrode plate 1702 is separated from the second positive electrode plate 1704 through another separator 1705, and all of the first negative electrode plates 1701, the second negative electrode plates 1702, the first positive electrode plates 1703, the second positive electrode plates 1704 and the plurality of separators 1705 are superimposed and then wound around a winding axis K to form a cylindrical winding structure.

In the electrode assembly in the present embodiment, as to the structures and positions of the tabs of the positive electrode plates and the tabs of the negative electrode plates, please refer to the related contents of the first tabs of the first electrode plate and the second tabs of the second electrode plate described in the above embodiments of FIG. 5 to FIG. 8, which will not be repeated redundantly herein.

In the winding structure, the innermost ring in the winding structure is a ring enclosed by the first negative electrode plates 1701, and the outermost ring of the winding structure is a ring enclosed by the second negative electrode plates 1702.

The positions of the first winding initial ends S of the first positive electrode plates 1703 and the second positive electrode plates 1704 are the same, for example, the first winding initial ends S of the first positive electrode plates 1703 and the second positive electrode plates 1704 are both arranged at the same radial direction of the winding structure, and the first winding initial ends S of the first positive electrode plates 1703 and the second positive electrode plates 1704 are flush.

The positions of the second winding initial ends S' of the first negative electrode plate 1701 and the second negative electrode plate 1702 are also the same, for example, the second winding initial ends S' of the first negative electrode plate 1701 and the second negative electrode plate 1702 are both arranged at the same radial direction of the winding structure, and the second winding initial ends S' of the first negative electrode plate 1701 and the second negative electrode plate 1702 are flush.

Along a reverse direction of the winding direction, the second winding initial end S' of the first negative electrode plate 1701 exceeds the first winding initial end S of the first positive electrode plate 1704. The second winding initial end S' of the second negative electrode plate 1702 exceeds the first winding initial end S of the second positive electrode plate 1703.

The positions of the first winding tail ends E of the first positive electrode plates 1703 and the second positive electrode plates 1704 are the same, for example, the first winding tail ends E of the first positive electrode plates 1703 and the second positive electrode plates 1704 are both arranged at the turning section 10B on the same side, and the first winding tail ends E of the first positive electrode plates 1703 and the second positive electrode plates 1704 are flush.

The positions of the second winding tail ends E' of the first negative electrode plate 1701 and the second negative electrode plate 1702 are also the same, for example, the second winding tail ends E' of the first negative electrode plate 1701 and the second negative electrode plate 1702 are both arranged in the same turning section 10B, and the second winding tail ends E' of the first negative electrode plate 1701 and the second negative electrode plate 1702 are flush.

Along a winding direction, the second winding tail end E' of the first negative electrode plate 1701 exceeds the first winding tail end E of the second positive electrode plate 1704, and the second winding tail end E' of the second negative electrode plate 1702 exceeds the first winding tail end E of the first positive electrode plate 1703.

The winding structure described above can enable the length differences of a plurality of electrode plates before winding to be approximate, thereby being easy to wind.

Figure 15:
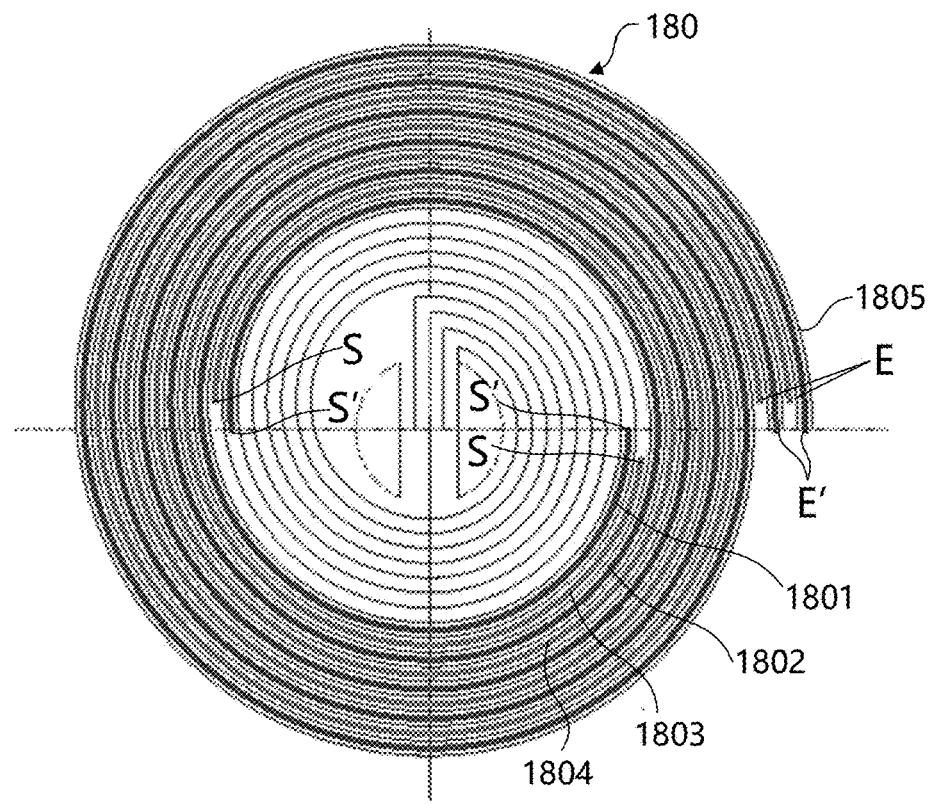

FIG. 15 is a structural schematic diagram showing that a cylindrical electrode assembly is vertical to the cross section of the winding axis K in another embodiment of the present disclosure. The electrode assembly 180 comprises a first negative electrode plate 1801, a second negative electrode plate 1802, a first positive electrode plate 1803, a second positive electrode plate 1804 and a plurality of separators 1805, wherein the first negative electrode plate 1801, the first positive electrode plate 1803, the second negative electrode plate 1802 and the second positive electrode plate 1804 are superimposed alternately in sequence, and the first negative electrode plate 1801 is separated from the first positive electrode plate 1803 through a separator 1805, the first positive electrode plate 1803 is separated from the second negative electrode plate 1802 through another separator 1805, the second negative electrode plate 1802 is separated from the second positive electrode plate 1804 through another separator 1805, and all of the first negative electrode plates 1801, the second negative electrode plates 1802, the first positive electrode plates 1803, the second positive electrode plates 1804 and the plurality of separators 1805 are superimposed and then wound around a winding axis K to form a cylindrical winding structure.

The structure of the electrode assembly 10 of the present embodiment is substantially similar to the structure of the electrode assembly 10 described in the embodiment of FIG. 14, and the differences will be described below. In the winding structure of the present embodiment, the innermost ring of the winding structure is a ring enclosed jointly by the first negative electrode plates 1801 and the second negative electrode plates 1802, and the outermost ring of the winding structure is a ring enclosed by the first negative electrode plates 1801.

In the winding structure of the present embodiment, the positions of the first winding initial ends S of the first positive electrode plates 1803 and the second positive electrode plates 1804 are different, for example, the first winding initial ends S of the first positive electrode plates 1803 and the second positive electrode plates 1804 are arranged at a relative radial direction of the winding structure, and the first winding initial ends S of the first positive electrode plates 1803 and the second positive electrode plates 1804 are not flush.

The positions of the second winding initial ends S of the first negative electrode plate 1801 and the second negative electrode plate 1802 are also different, for example, the second winding initial end S' of the first negative electrode plate 1801 and the second winding initial end S' of the second negative electrode plate 1802 are arranged at a relative radial direction of the winding structure, and the second winding initial ends S' of the first negative electrode plate 1801 and the second negative electrode plate 1802 are not flush.

The winding structure described above can reduce the step formed by the first positive electrode plates 1803 and the second positive electrode plates 1804 at the first winding initial end S, and reduce the step formed by the first negative electrode plate 1801 and the second negative electrode plate 1802 at the second winding initial end S', so as to reduce local stress exerted onto the electrode plate at the winding initial end after the electrode assembly expands and is in contact with the housing 20, prevent cracking of the electrode plate or falling off of the active substance, and improve the reliability of long-term operation of the electrode assembly.

Figure 16:
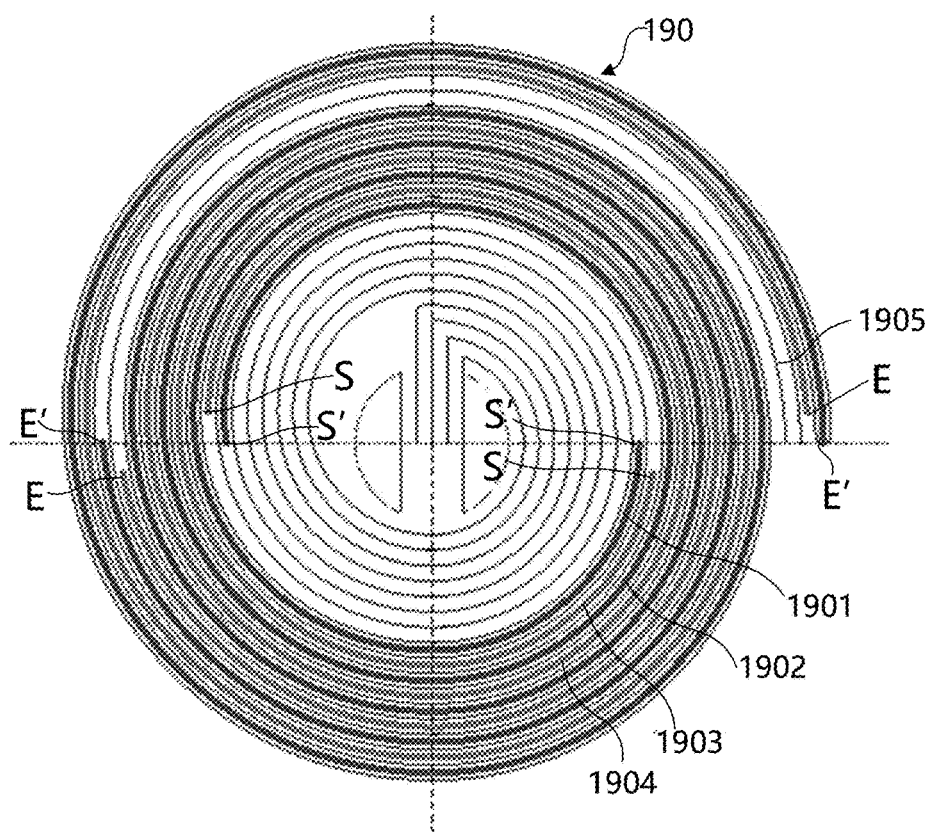

FIG. 16 is a structural schematic diagram showing that a cylindrical electrode assembly is vertical to the cross section of the winding axis K in another embodiment of the present disclosure. The electrode assembly 190 comprises a first negative electrode plate 1901, a second negative electrode plate 1902, a first positive electrode plate 1903, a second positive electrode plate 1904 and a plurality of separators 1905, wherein the first negative electrode plate 1901, the first positive electrode plate 1903, the second negative electrode plate 1902 and the second positive electrode plate 1904 are superimposed alternately in sequence, and the first negative electrode plate 1901 is separated from the first positive electrode plate 1903 through a separator 1905, the first positive electrode plate 1903 is separated from the second negative electrode plate 1902 through another separator 1905, the second negative electrode plate 1902 is separated from the second positive electrode plate 1904 through another separator 1905, and all of the first negative electrode plates 1901, the second negative electrode plates 1902, the first positive electrode plates 1903, the second positive electrode plates 1904 and a plurality of separators 1905 are superimposed and then wound around a winding axis K to form a flat winding structure.

The structure of the present embodiment is substantially similar to the structure described in the embodiment of FIG. 15, and the differences will be described below. In the winding structure of the present embodiment, the innermost ring of the winding structure is a ring enclosed jointly by the first negative electrode plates 1901 and the second negative electrode plates 1902, and the outermost ring of the winding structure is a ring enclosed by the first negative electrode plates 1901.

In the winding structure of the present embodiment, the positions of the first winding initial ends E of the first positive electrode plates 1903 and the second positive electrode plates 1904 are different, and the second winding tail ends E' of the first negative electrode plate 1901 and the second negative electrode plate 1902 are also different.

Along a winding direction, the first negative electrode plate 1901 is arranged at the outermost layer and the end position of the second winding tail end E' exceeds the end position of the second winding tail end E' of the second negative electrode plate 1902, and the end position of the second winding tail end E' of the first positive electrode plates 1903 exceeds the end position of the second winding tail end E' of the second positive electrode plates 1904, for example, exceeding by half a ring, and the exceeded part presses inwards along a radial direction until the exceeded part is in contact with the electrode plates in the inner layer, to improve the stability of the winding structure.

The winding structure described above can simultaneously reduce the steps formed by the first positive electrode plates 1903 and the second positive electrode plates 1904 at the first winding initial end S and the first winding tail end E, and reduce the steps formed by the first negative electrode plates 1901 and the second negative electrode plates 1902 at the second winding initial end S' and the second winding tail end E', so as to reduce local stress exerted onto the electrode plate at the winding initial end and the winding tail end after the electrode assembly expands and is in contact with the housing 20, prevent cracking of the electrode plate or falling off of the active substance, and improve the reliability of long-term operation of the electrode assembly.

Moreover, the number of layers of the winding structure in different radial directions can be the same, for the cylindrical winding structure, when the electrode assembly expands and is in contact with the housing 20, the stress on each point along the circumferential direction is consistent.

Figure 17:
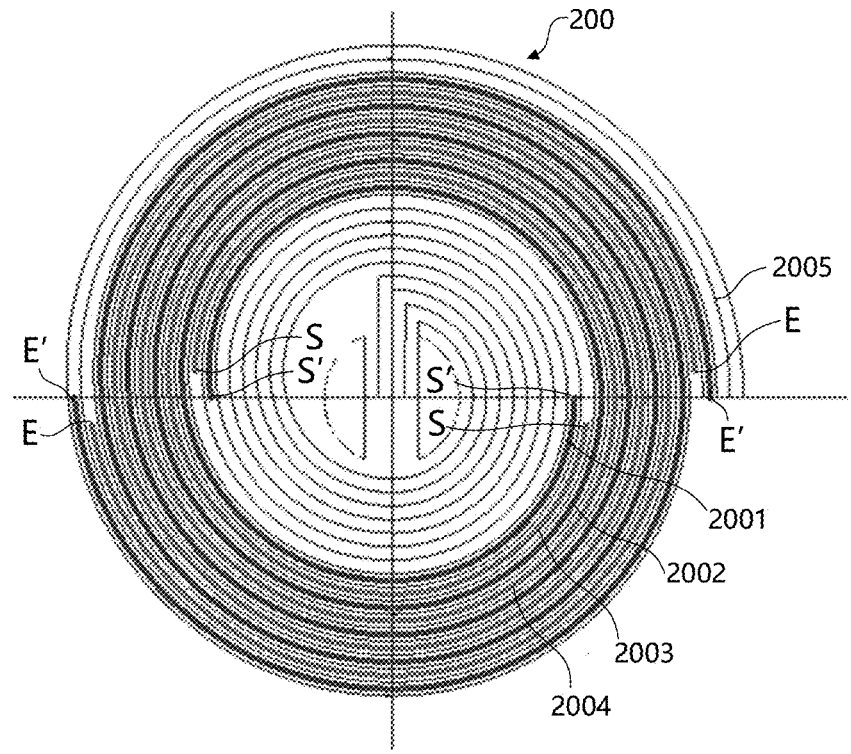

FIG. 17 is a structural schematic diagram showing that a cylindrical electrode assembly is vertical to the cross section of the winding axis K in another embodiment of the present disclosure. The electrode assembly 200 comprises a first negative electrode plate 2001, a second negative electrode plate 2002, a first positive electrode plate 2003, a second positive electrode plate 2004 and a plurality of separators 2005, wherein the first negative electrode plate 2001, the first positive electrode plate 2003, the second negative electrode plate 2002 and the second positive electrode plate 2004 are superimposed alternately in sequence, and the first negative electrode plate 2001 is separated from the first positive electrode plate 2003 through a separator 2005, the first positive electrode plate 2003 is separated from the second negative electrode plate 2002 through another separator 2005, the second negative electrode plate 2002 is separated from the second positive electrode plate 2004 through another separator 2005, and all of the first negative electrode plates 2001, the second negative electrode plates 2002, the first positive electrode plates 2003, the second positive electrode plates 2004 and the plurality of separators 2005 are superimposed and then wound around a winding axis K to form a flat winding structure.

The structure of the electrode assembly 10 of the present embodiment is substantially similar to the structure of the electrode assembly 10 described in the embodiment of FIG. 15, and the differences will be described below. In the winding structure of the present embodiment, the innermost ring in the winding structure is a ring enclosed jointly by the first negative electrode plates 2001 and the second negative electrode plates 2002, and the outermost ring of the winding structure is a ring enclosed jointly by the first negative electrode plates 2001 and the second negative electrode plates 2002.

Along a winding direction, the second negative electrode plate 2002 is arranged at the outermost layer and the end position of the second winding tail end E' exceeds the end position of the second winding tail end E' of the first negative electrode plate 2001, and the end position of the second winding tail end E' of the second positive electrode plate 2004 exceeds the end position of the second winding tail end E' of the first positive electrode plate 2003, for example, exceeding by half a ring.

The winding structure described above can simultaneously reduce the steps formed by the first positive electrode plate 2003 and the second positive electrode plate 2004 at the first winding initial end S and the first winding tail end E, and reduce the steps formed by the first negative electrode plate 2001 and the second negative electrode plate 2002 at the second winding initial end S' and the second winding tail end E', so as to reduce local stress exerted onto the electrode plate at the winding initial end and the winding tail end after the electrode assembly expands and is in contact with the housing 20, prevent cracking of the electrode plate or falling off of the active substance, and improve the reliability of long-term operation of the electrode assembly.

Moreover, the number of layers of the winding structure in different radial directions can be the same, for the cylindrical winding structure, when the electrode assembly expands and is in contact with the housing 20, the stress on each point along the circumferential direction is consistent.

In addition, this structure can avoid bending of the outermost layer of electrode plates and the penultimate layer of electrode plates at the winding tail end of other electrode plates, such that all of the layers of electrode plates are in reliable contact, and no local stress is easily produced on the electrode plates, thereby preventing cracking of the electrode plate or falling off of the active substance.

Figure 18:
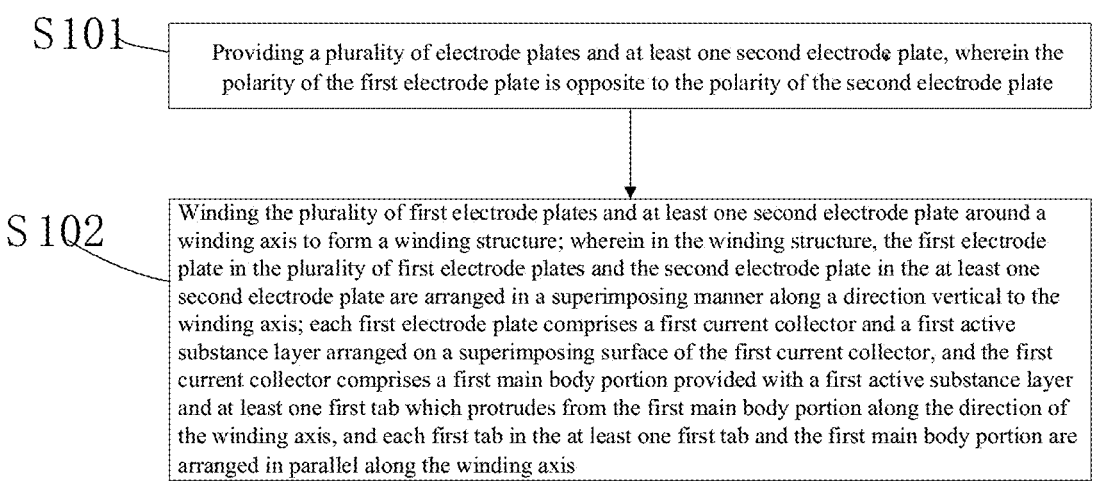
FIG. 18 is a flow diagram of some embodiments of a manufacturing method of an electrode assembly of the present disclosure.

Secondly, the present disclosure further provides a manufacturing method of an electrode assembly, in some embodiments, the flow diagram as shown in FIG. 18 comprises:
    step 101, providing a plurality of first electrode plates 1 and at least one second electrode plate 2, wherein the polarity of the first electrode plate 1 is opposite to the polarity of the second electrode plate 2; and step 102, winding the plurality of first electrode plates 1 and the at least one second electrode plate 2 around the winding axis K to form a winding structure;

wherein in the winding structure, the first electrode plate 1 in the plurality of first electrode plates 1 and the second electrode plate 2 in the at least one second electrode plate 2 are arranged in a superimposing manner along a direction vertical to the winding axis K; each first electrode plate 1 comprises a first current collector 11 and a first active substance layer 12 arranged on the superimposing surface of the first current collector 11, the first current collector comprises a first main body portion 111 provided with the first active substance layer 12 and a first tab 112 which protrudes from the first main body portion 111 along the direction of the winding axis, and the first tab 112 and the first main body portion 111 are arranged in parallel along the winding axis.

In the present embodiment, through setting a plurality of first electrode plates 1, the number of winding turns of the electrode assembly 10 can be reduced, then the amount of misplacement of the first tab 112 on the circumferential direction after winding can be reduced, and connection with the collector component 30 is facilitated.

Figure 19:
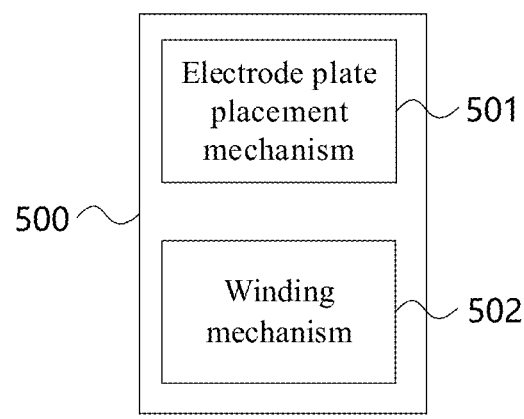
FIG. 19 is a structural schematic diagram of some embodiments of a manufacturing device of an electrode assembly of the present disclosure.

Finally, the present disclosure further provides a manufacturing device 500 of the electrode assembly, in some embodiments, as shown in FIG. 19, the manufacturing device 500 comprises:

an electrode plate placement mechanism 501, configured to provide a plurality of first electrode plates 1 and at least one second electrode plate 2, wherein the polarity of the first electrode plate 1 is opposite to the polarity of the second electrode plate 2; and a winding mechanism 502, configured to wind a plurality of first electrode plates 1 and at least one second electrode plate 2 around the winding axis K to form a winding structure, wherein in the winding structure, the first electrode plate 1 of the plurality of first electrode plates 1 and the second electrode plate 2 in at least one second electrode plate 2 are arranged alternately along the direction vertical to the winding axis K; each first electrode plate 1 comprises a first current collector 11 and a first active substance layer 12 arranged on a superimposing surface of the first current collector 11, and the first current collector 11 comprises a first main body portion 111 provided with a first active substance layer 12 and a first tab 112 which protrudes from the first main body portion 111 along the direction of the winding axis, and the first tab 112 and the first main body portion 111 are distributed in parallel along the winding axis. The winding mechanism 502 can provide a stable winding tensile force for the superimposed electrode plates.

The electrode assembly 10 manufactured through the manufacturing device 500 of the electrode assembly can reduce the winding errors in the winding process.

Finally, it should be noted that, the above embodiments are merely for illustrating the technical solutions of the present disclosure, rather than for limiting the present disclosure. Although the present disclosure is described in detail with reference to the preferred embodiments, those skilled in the art should understand that, specific embodiments of the present disclosure can still be modified or part of the technical features can be equivalently substituted; while all of the modifications or substitutions which do not depart from the spirit of the technical solutions of the present disclosure shall all fall within the scope of the technical solutions claimed in the present disclosure.

What is claimed is:

1. An electrode assembly, comprising:
a plurality of first electrode plates; and
at least one second electrode plate,
wherein the polarity of the first electrode plates is opposite to the polarity of the second electrode plate,
wherein the plurality of the first electrode plates and the at least one second electrode plate are wound around a winding axis to form a winding structure, and
in the winding structure, the plurality of first electrode plates and the at least one second electrode plate are arranged in a superimposing manner along a direction vertical to the winding axis,
wherein each first electrode plate in the plurality of first electrode plates comprises a first current collector and a first active substance layer arranged on a superimposing surface of the first current collector, and the first current collector comprises a first main body portion provided with the first active substance layer and at least one first tab which protrudes from the first main body portion along the direction of the winding axis, and the first active substance layer covers the entire surface of the first main body in the length direction,
wherein each first tab in the at least one first tab and the first main body portion are arranged in parallel along the winding axis,
wherein the positions of winding initial ends of at least two first electrode plates in the plurality of first electrode plates are different,
wherein the winding structure is flat and comprises a straight section and turning sections arranged at two sides of the straight section, and
wherein a winding tail end of at least one first electrode plate in the plurality of first electrode plates is arranged in the turning section.

2. The electrode assembly as claimed in claim 1, wherein each first electrode plate comprises a plurality of first tabs which are arranged at intervals.

3. The electrode assembly as claimed in claim 2, wherein in the winding structure, each first electrode plate is provided with at least one tab on each circle of the first electrode plate.

4. The electrode assembly as claimed in claim 2, wherein any two first tabs in all of the first tabs are at least partially overlapped.

5. The electrode assembly as claimed in claim 2, wherein all of the first tabs are arranged in the straight section.

6. The electrode assembly as claimed in claim 1, wherein in the winding structure, each first electrode plate is provided with at least one tab on each circle of the first electrode plate.

7. The electrode assembly as claimed in claim 1, wherein any two first tabs in all of the first tabs are at least partially overlapped.

8. The electrode assembly as claimed in claim 1, wherein all of the first tabs are arranged in the straight section.

9. The electrode assembly as claimed in claim 7, wherein the straight section comprises a first straight sub-section and a second straight sub-section which are substantially parallel and distributed symmetrically about the winding axis, and wherein all of the first tabs are arranged in the first straight sub-section or the second straight sub-section.

10. The electrode assembly as claimed in claim 8, wherein the straight section comprises a first straight sub-section and a second straight sub-section which are substantially parallel and distributed symmetrically about the winding axis, and
wherein a part of all of the first tabs are arranged in the first straight sub-section, while the other of the first tabs are arranged in the second straight sub-section.

11. The electrode assembly as claimed in claim 1, wherein the positions of winding tail ends of at least two first electrode plates in the plurality of first electrode plates are different.

12. The electrode assembly as claimed in claim 1, wherein the electrode assembly comprises a plurality of second electrode plates, and
wherein the positions of winding initial ends of at least two second electrode plates in the plurality of second electrode plates are different.

13. The electrode assembly as claimed in claim 1, wherein the electrode assembly comprises a plurality of second electrode plates, and
wherein the positions of winding tail ends of at least two second electrode plates in the plurality of second electrode plates are different.

14. The electrode assembly as claimed in claim 1, wherein the electrode assembly comprises a plurality of second electrode plates,
wherein a winding tail end of at least one second electrode plate in the plurality of second electrode plates is arranged in the turning section.

15. The electrode assembly as claimed in claim 1, wherein in different radial directions of the winding structure, the difference of number of layers of the first electrode plate and the second electrode plate does not exceed a preset number of layers.

16. The electrode assembly as claimed in claim 15, wherein the preset number of layers is less than or equal to the sum of the number of all of the first electrode plates and all of the second electrode plates.

17. A battery, comprising:
a case; and
an electrode assembly as claimed in claim 1, wherein the electrode assembly is arranged in the case.

18. A battery module, comprising a plurality of batteries as claimed in claim 17.

* * * * *